United States Patent
Mizutani et al.

(10) Patent No.: US 9,885,973 B2
(45) Date of Patent: Feb. 6, 2018

(54) OPTICAL DEFLECTOR, AND OPTICAL SCANNING DEVICE AND IMAGE FORMING APPARATUS EQUIPPED WITH SAME

(71) Applicant: KYOCERA Document Solutions Inc., Osaka-shi, Osaka (JP)

(72) Inventors: Hideji Mizutani, Osaka (JP); Hiroatsu Tamai, Osaka (JP)

(73) Assignee: KYOCERA DOCUMENT SOLUTIONS INC., Osaka-shi, Osaka (JP)

( * ) Notice: Subject to any disclaimer, the term of this patent is extended or adjusted under 35 U.S.C. 154(b) by 0 days.

(21) Appl. No.: 15/484,338

(22) Filed: Apr. 11, 2017

(65) Prior Publication Data

US 2017/0299976 A1 Oct. 19, 2017

(30) Foreign Application Priority Data

Apr. 15, 2016 (JP) ................................. 2016-081613

(51) Int. Cl.
| | |
|---|---|
| *G03G 15/00* | (2006.01) |
| *G03G 15/04* | (2006.01) |
| *G02B 26/12* | (2006.01) |
| *G02B 27/00* | (2006.01) |

(52) U.S. Cl.
CPC ..... *G03G 15/04036* (2013.01); *G02B 26/121* (2013.01); *G02B 26/123* (2013.01); *G02B 26/127* (2013.01); *G02B 27/0006* (2013.01)

(58) Field of Classification Search
USPC ........................ 399/4, 5, 177, 216, 220, 221
See application file for complete search history.

(56) References Cited

U.S. PATENT DOCUMENTS

| 7,474,451 B2 * | 1/2009 | Yamakawa | G02B 26/124 |
| | | | 359/216.1 |
| 8,471,883 B2 * | 6/2013 | Serizawa | G02B 26/10 |
| | | | 347/245 |
| 9,056,489 B2 * | 6/2015 | Hirakawa | B41J 2/471 |
| 2007/0013989 A1 * | 1/2007 | Lim | G02B 7/008 |
| | | | 359/216.1 |
| 2016/0091818 A1 * | 3/2016 | Iwai | G03G 15/0409 |
| | | | 399/216 |

FOREIGN PATENT DOCUMENTS

JP 2008-139348 6/2008

* cited by examiner

*Primary Examiner* — Hoan Tran
(74) *Attorney, Agent, or Firm* — Gerald E. Hespos; Michael J. Porco; Matthew T. Hespos

(57) ABSTRACT

Disclosed is an optical deflector which includes: a polygonal mirror, a drive motor, a cover member, and a temperature detection unit. The cover member includes: a first cover portion defining a first space in which the polygonal mirror is installed, wherein the first cover portion is formed with a first opening opened in opposed relation to an outer peripheral surface of the polygonal mirror; a second cover portion defining a second space which is communicated with the first space and in which the drive motor is installed, wherein the second cover portion is formed with a second opening opened in opposed relation to a motor body of the drive motor; and a third cover portion defining a third space which is communicated with the second space. The temperature detection unit is mounted to the third cover portion so as to close the third space.

8 Claims, 16 Drawing Sheets

OPTICAL DEFLECTOR, AND OPTICAL SCANNING DEVICE AND IMAGE FORMING APPARATUS EQUIPPED WITH SAME

CROSS-REFERENCE TO RELATED APPLICATION

This application is based on Japanese Patent Application Serial No. 2016-81613 filed in Japan Patent Office on Apr. 15, 2016, the contents of which are hereby incorporated by reference.

RELATED FIELD

The present disclosure relates to an optical deflector including a polygonal mirror, and an optical scanning device and an image forming apparatus each equipped with the optical deflector.

BACKGROUND

As an optical scanning device for use in an image forming apparatus such as a color printer, there is one type of optical scanning device which includes: an optical deflector including a polygonal mirror and for deflecting light from a light source; an imaging lens for forming an image of the light deflected by the polygonal mirror, on each of a plurality of photosensitive drum; a temperature sensor, and a housing. The housing has spaces each receiving therein a respective one of the imaging lens and the optical deflector, separately. The temperature sensor is installed in the space receiving therein the imaging lens, in adjacent relation to a radiator plate for the polygonal mirror.

In this optical scanning device, an internal temperature of the housing is detected by the temperature sensor installed in the space separated from the space receiving the optical deflector therein. Based on a temperature detected by the temperature sensor, positional deviation in scanning applied to the photosensitive drums by the polygonal mirror due to deformation of the housing caused by heat generated from a drive motor for rotating the polygonal mirror is calculated, and a timing of the scanning by the polygonal mirror is corrected according to the calculated amount. The above conventional technique is intended to correct the timing of the scanning by the polygonal mirror, based on a temperature detected by the temperature sensor, to thereby suppress the occurrence of mis-color registration in a color image corresponding to electrostatic latent images formed on the respective photosensitive drums through the scanning by the polygonal mirror.

SUMMARY

According to a first aspect of the present disclosure, there is provided an optical deflector including a drive motor, a polygonal mirror, a cover member and a temperature detection unit.

The drive motor includes a motor body and a rotary shaft protruding from the motor body. The polygonal mirror is provided on one end of the rotary shaft located on one side in an axial direction of the rotary shaft, in an integrally rotatable manner, and having an outer peripheral surface to be irradiated with light. The polygonal mirror is configured to deflect light irradiating the outer peripheral surface thereof in such a manner as to enable the deflected light to be scanned with respect to a given irradiation target member, while being rotated about the rotary shaft. The cover member covers the polygonal mirror and the drive motor. The temperature detection unit is configured to detect an internal temperature of the cover member. The cover member includes: a first cover portion, a second cover portion and a third cover portion. The first cover portion covers the polygonal mirror from the one side in the axial direction to thereby define a first space in which the polygonal mirror is installed. The first cover portion is formed with a first opening opened in opposed relation to the outer peripheral surface of the polygonal mirror. The second cover portion is disposed on the other side opposite to the one side in the axial direction, with respect to the first cover portion, to define a second space which is communicated with the first space and in which the drive motor is installed. The second cover portion is formed with a second opening opened in opposed relation to the motor body. The third cover portion defines a third space which is communicated with the second space. The temperature detection unit is mounted to the third cover portion in such a manner as to close the third space.

According to a second aspect of the present disclosure, there is provided an optical scanning device including the above optical deflector, a light source and a correction section. The light source is configured to emit light toward the outer peripheral surface of the polygonal mirror. The correction section is configured to correct positional deviation in scanning applied to the irradiation target member by the polygonal mirror, based on temperature data detected by the temperature detection unit.

According to a third aspect of the present disclosure, there is provided an image forming apparatus including the above optical scanning device, and an image carrying member serving as the irradiation target member which is to be scanned with light deflected by the polygonal mirror so as to form an electrostatic latent image on a surface thereof.

DETAILED DESCRIPTION

Figure 1:
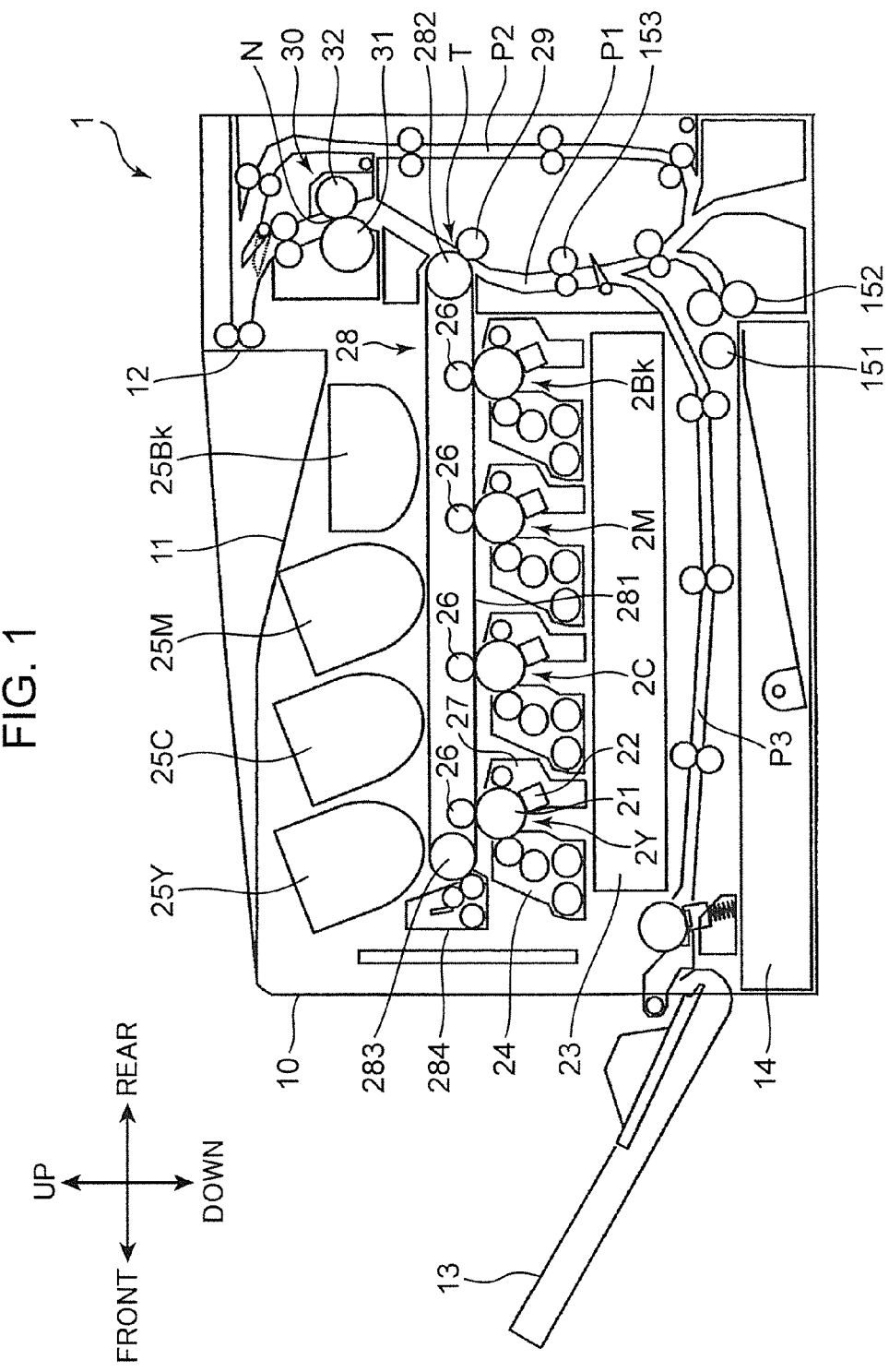
FIG. 1 is a sectional view depicting a schematic configuration of an image forming apparatus according to one embodiment of the present disclosure.

Based on the drawings, an optical deflector according to one embodiment of the present disclosure, and an optical scanning device and an image forming apparatus each equipped with the optical deflector will now be described. FIG. 1 is a sectional view depicting a schematic configuration of an image forming apparatus 1 according to one embodiment of the present disclosure. The image forming apparatus 1 is a tandem-type color printer, and includes a body housing 10 composed of an approximately rectangular parallelepiped-shaped housing. It should be noted that the image forming apparatus 1 may be a full-color copier or a full-color complex machine.

The body housing 10 internally houses a plurality of processing units for subjecting a sheet to image forming processing. In this embodiment, the processing units include four image forming units 2Y, 2C, 2M, 2Bk, an optical scanning device 23, an intermediate transfer unit 28, and a fixing device 30. The body housing 10 has an upper surface formed as a catch tray 11. A sheet ejection port 12 is opened in opposed relation to the catch tray 11. The body housing 10 has a sidewall to which a manual feed tray 13 is mounted in an openable and closable manner. The body housing 10 has a bottom region to which a sheet cassette 14 for storing therein a plurality of sheets to be subjected to the image forming processing is detachably attached.

The image forming units 2Y, 2C, 2M, 2Bk are designed to form respective toner images of yellow (Y), cyan (C), magenta (M) and black (Bk), based on image information transmitted from an external device such as a computer, and arranged horizontally and tandemly at given intervals. Each of the image forming units 2Y, 2C, 2M, 2Bk includes: a circular cylindrical-shaped photosensitive drum 21 (image carrying member/irradiation target member) having a surface capable of carrying an electrostatic latent image and a toner image; an electrostatic charger 22 for electrostatically charging an outer peripheral surface of the photosensitive drum 21; a developing device 24 for adhering a developer to the electrostatic latent image, to form a toner image; a toner container (25Y, 25C, 25M, 25Bk) for supplying a toner of a corresponding one of yellow, cyan, magenta and black, to the developer 24; a primary transfer roller 26 for causing primary transfer of the toner image formed on the photosensitive drum 21; and a cleaning device 27 for removing residual toner on the outer peripheral surface of the photosensitive drum 21.

In the following description, when the photosensitive drums 21 provided, respectively, in the image forming units 2Y, 2C, 2M, 2Bk are particularly described, the photosensitive drum provided in the image forming unit 2Y and the photosensitive drum provided in the image forming unit 2C will be referred to respectively as a "first photosensitive drum 21Y" and a "second photosensitive drum 21C", and the photosensitive drum provided in the image forming unit 2M and the photosensitive drum provided in the image forming unit 2Bk will be referred to respectively as a "third photosensitive drum 21M" and a "fourth photosensitive drum 21Bk".

The optical scanning device 23 is designed to form an electrostatic latent image on the outer peripheral surface of the photosensitive drum 21 for each color. In this embodiment, the optical scanning device 23 includes: an incidence optical system having a plurality of light sources prepared for respective colors; an optical deflector for deflecting light beams emitted from the light sources; an imaging optical system for causing each of the beams deflected by the optical deflector to be imaged and scanned on the outer peripheral surface of the photosensitive drum 21 for a corresponding one of the colors. This optical scanning device 23 will be described in detail later.

The intermediate transfer unit 28 is designed to subject the toner image formed on the photosensitive drum 21 to primary transfer. The intermediate transfer unit 28 includes a transfer belt 281 endlessly circulating while being kept in contact with each of the outer peripheral surfaces of the photosensitive drums 21, and a drive roller 282 and a driven roller 283 between which the transfer belt 281 is wound around. The transfer belt 281 is pressed against each of the outer peripheral surfaces of the photosensitive drums 21 by a corresponding one of the primary transfer rollers 26. The toner images on the photosensitive drums 21 for respective colors are initially transferred in such a manner as to be superimposed on each other in the same area on the transfer belt 281. In this way, a full-color toner image is formed on the transfer belt 281.

A secondary transfer roller 29 is disposed in opposed relation to the drive roller 282 to define a secondary-transfer nip region T with respect to the transfer belt 281 interposed therebetween. The full-color image on the transfer belt 281 is secondarily transferred onto a sheet in the secondary-transfer nip region T. Residual toner remaining on an outer peripheral surface of the transfer belt 281 without being transferred onto the sheet is collected by a belt cleaning device 284 disposed in opposed relation to the driven roller 283.

The fixing device 30 includes a fixing roller 31 having a heat source embedded therein, and a pressure roller 32 defining a fixing nip region N in cooperation with the fixing roller 31. The fixing device 30 is designed to heat and press the sheet onto which the toner image is transferred in the secondary-transfer nip region T, to thereby subject the sheet to fixing processing of melting the toner so as to be fixedly adhered to the sheet. The sheet after being subjected to the fixing processing is ejected from the sheet ejection port 12 toward the catch tray 11.

The body housing 10 is internally provided with a sheet conveyance passage for conveying a sheet. The sheet conveyance passage includes a main conveyance passage P1 extending vertically from a position adjacent to the bottom region to a position adjacent to a top of the body housing 10 via the secondary-transfer nip region T and the fixing device 30. The main conveyance passage P1 has a downstream end connected to the sheet ejection port 12. A reverse conveyance passage P2 is provided to extend from a downstream most end to a position adjacent to an upstream end of the main conveyance passage P1 so as to reversely convey a sheet during double-side printing. Further, a manually-set sheet conveyance passage P3 is disposed above the sheet cassette 14 to extend from the manual feed tray 13 to the main conveyance passage P1.

The sheet cassette 14 has a sheet storing section for storing therein a stack of sheets. In a region just above a right end of the sheet cassette 14, there are provided a pickup roller 151 for sequentially picking up an uppermost one of the stack of sheets, and a sheet feed roller pair 152 for feeding the picked-up sheet toward the upstream end of the main conveyance passage P1. A sheet placed on the manual feed tray 13 is also fed toward the upstream end of the main conveyance passage P1 through the manually-set sheet conveyance passage P3. At a position upstream of the secondary-transfer nip region T of the main conveyance passage P1, a registration roller pair 153 is disposed to feed a sheet toward the secondary-transfer nip region T at a given timing.

When a sheet is subjected to single-side printing (image forming), the sheet is fed from the sheet cassette 14 or the manual feed tray 13 to the main conveyance passage P1, and subjected to transfer processing of transferring a toner image to the sheet, in the secondary-transfer nip region T, and then to fixing processing of fixing the transferred toner to the sheet, in the fixing device 30. Subsequently, the resulting sheet is ejected from the sheet ejection port 12 onto the catch tray 11. On the other hand, when a sheet is subjected to double-side printing, after subjecting one side of the sheet to the transfer processing and the fixing processing, the resulting sheet is partially ejected from the sheet ejection port 12 toward the catch tray 11. Then, the sheet is switched back and conveyed reversely to a position adjacent to the upstream of the main conveyance passage P1 via the reverse conveyance passage P2. Subsequently, the other side of the returned sheet is subjected to the transfer processing and the fixing processing, and the resulting sheet is ejected from the sheet ejection port 12 onto the catch tray 11.

Next, an optical scanning device 23 according to one embodiment of the present disclosure will be described in detail.

Figure 2:
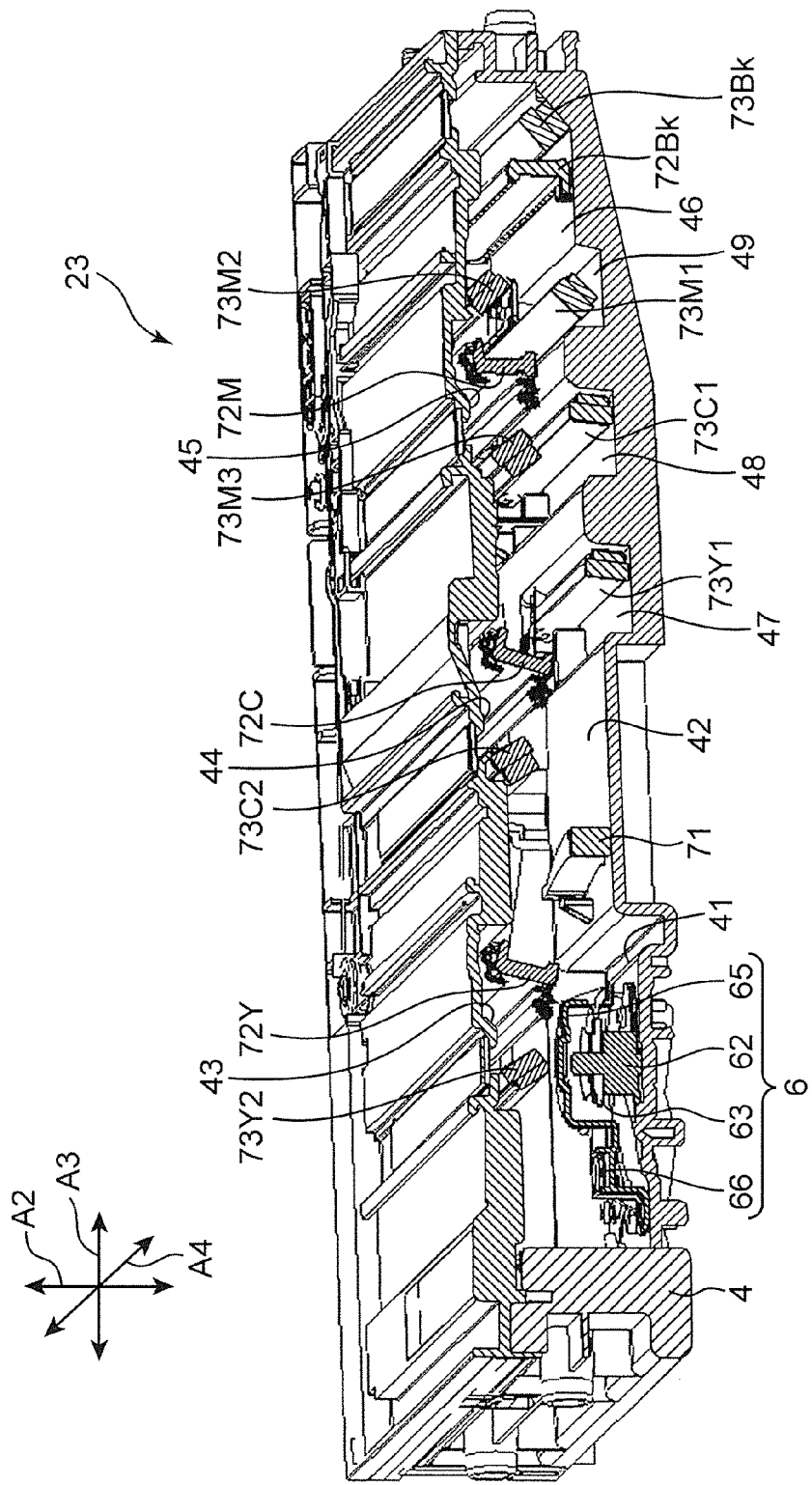
FIG. 2 is a perspective view depicting a schematic configuration of an optical scanning device according to one embodiment of the present disclosure.
Figure 3:
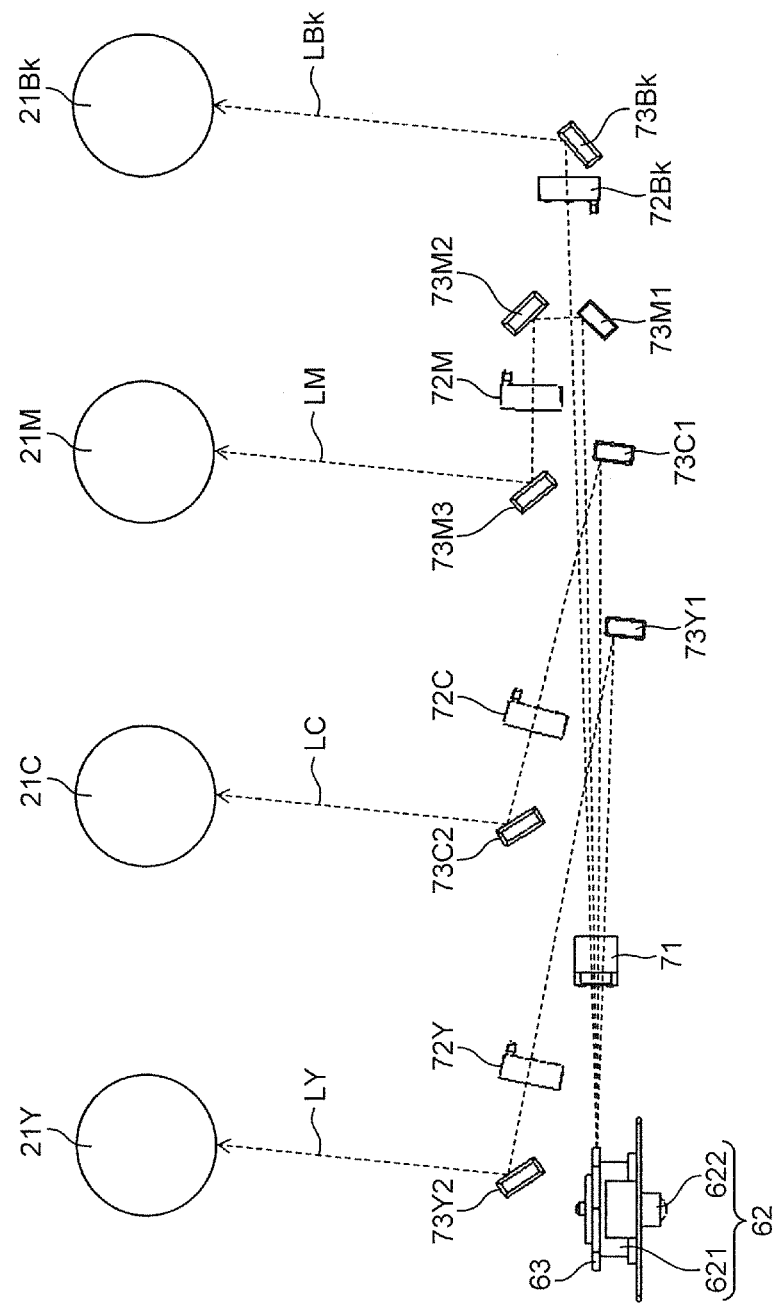
FIG. 3 is a ray diagram depicting a configuration of the optical scanning device in sub-scanning cross-section.
Figure 4:
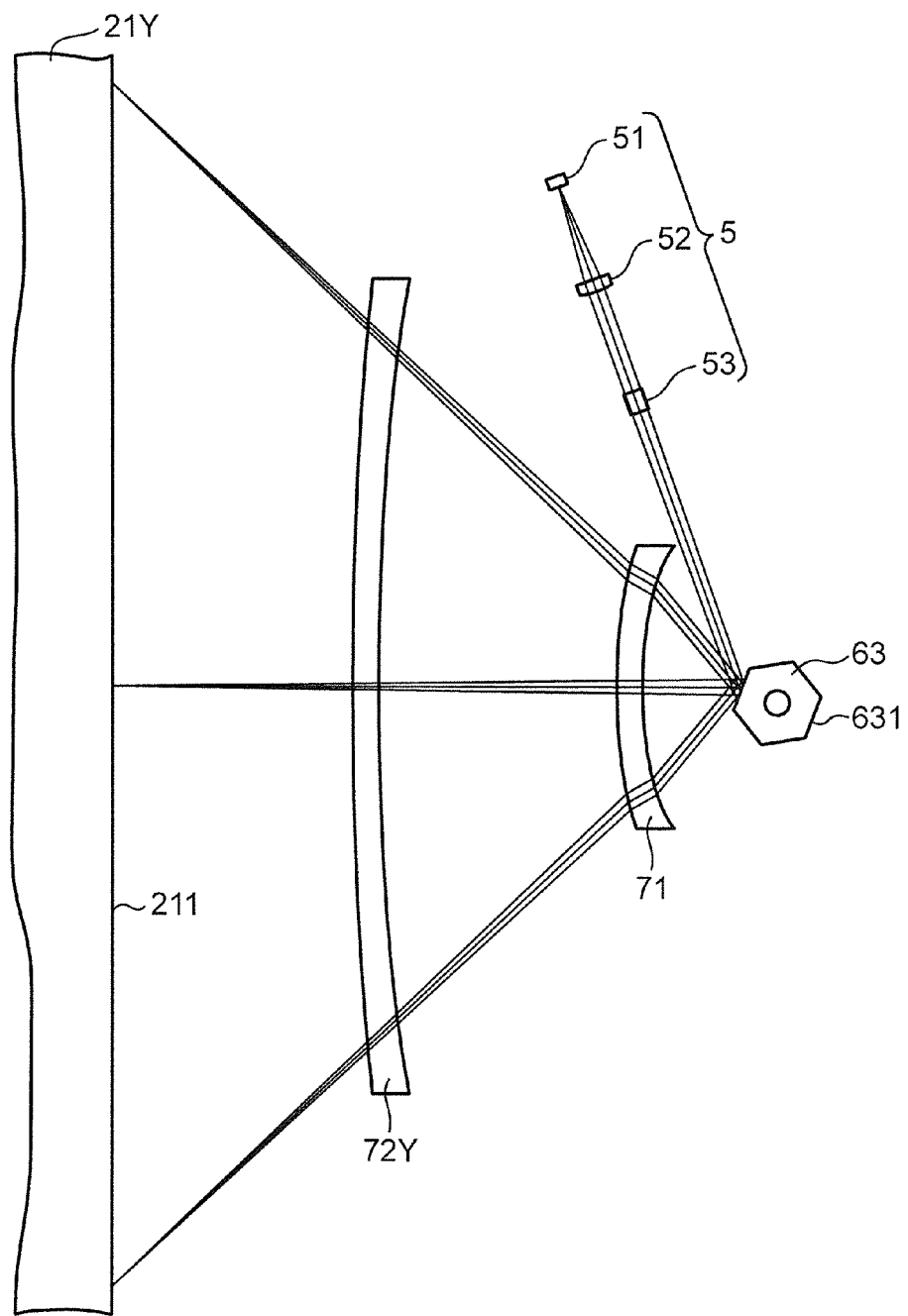
FIG. 4 is a ray diagram depicting a configuration of the optical scanning device in main scanning cross-section.
Figure 5:
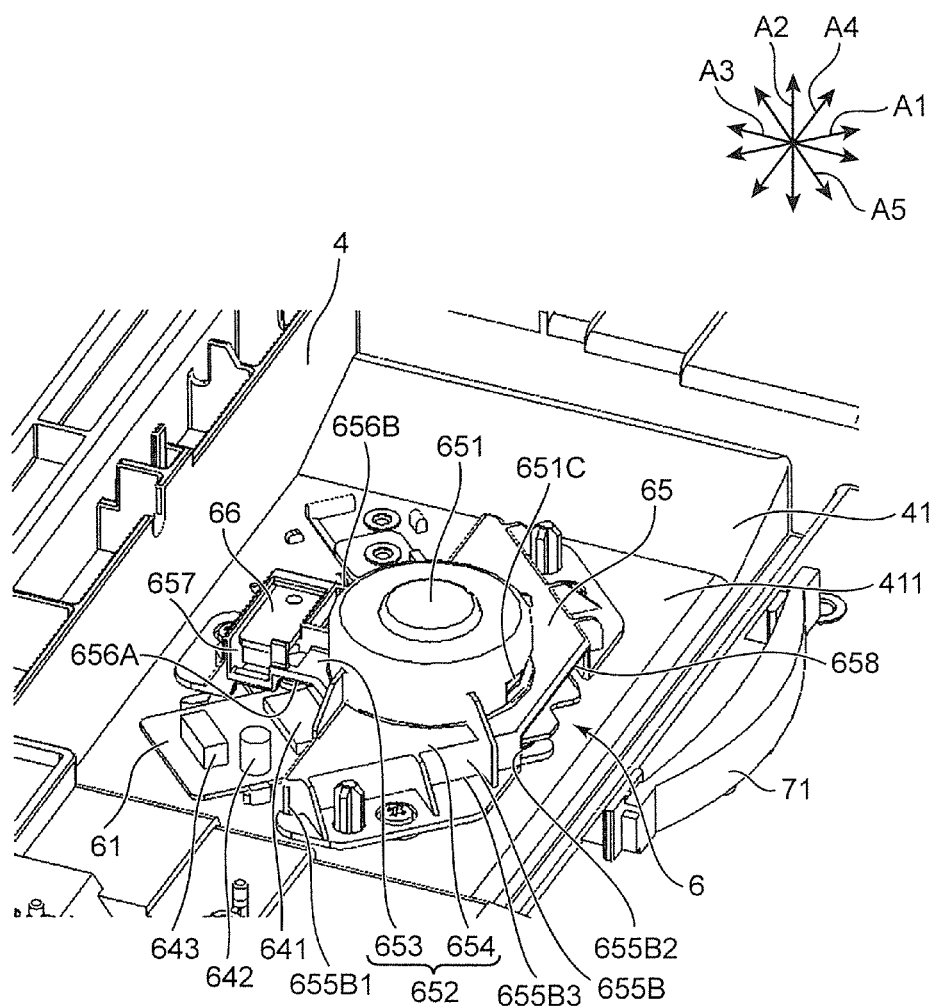
FIG. 5 is a perspective view depicting a schematic diagram of an optical deflector according to one embodiment of the present disclosure.

FIG. 2 is a perspective view depicting a schematic configuration of the optical scanning device 23 according to this embodiment. FIG. 3 is a ray diagram depicting a configuration of the optical scanning device 23 in sub-scanning cross-section, and FIG. 4 is a ray diagram depicting a configuration of the optical scanning device 23 in main scanning cross-section. FIG. 5 is a perspective view depicting a schematic diagram of an optical deflector 6 according to one embodiment of the present disclosure. In the following description, referring to FIG. 5, a direction along which an elongate substrate 61 provided in the optical deflector 6 extends will be referred to as a "longitudinal direction A1", and a direction along which a rotary shaft 622 of a drive motor 62 provided in an optical deflector 6 extends will be referred to as an "axial direction A2". Further, a direction intersecting the longitudinal direction A1 and orthogonal to the axial direction A2 will be referred to as a "first direction A3", and a direction orthogonal to both of the axial and first directions A2, A3, and a direction orthogonal to both of the longitudinal and axial directions A1, A2 will be referred to respectively as a "second direction A4" and a "third direction A5".

In the optical scanning device 23 disposed within the body housing 10 to extend horizontally at a position below the image forming units 2Y, 2C, 2M, 2Bk and the intermediate transfer unit 28, the axial direction A2 and the first direction A3 are coincident, respectively, with an upward-downward direction and a forward-rearward direction which is a moving direction of the transfer belt 281 being endlessly circulating, and the second direction A4 is coincident with a rightward-leftward direction which is a direction of a rotational axis of each of the photosensitive drums 21. Each of the longitudinal direction A1 and the third direction A5 intersects a respective one of the first direction A3 and the second direction A4 at about 45 degrees. Further, in the axial direction A2 coincident with an upward-downward direction, an upward side in the upward-downward direction will be referred to as "one side", and a downward side in the upward-downward direction will be referred to as "the other side". In the first direction A3 coincident with a forward-rearward direction, a forward side in the forward-rearward direction will be referred to as "one side", and a rearward side in the forward-rearward direction will be referred to as "the other side". In the second direction A4 coincident with a rightward-leftward direction, a rightward side in the rightward-leftward direction will be referred to as "one side", and a leftward side in the rightward-leftward direction will be referred to as "the other side".

The optical scanning device 23 is operable to scan outer peripheral surfaces 211 of the first photosensitive drum 21Y for yellow, the second photosensitive drum 21C for cyan, the third photosensitive drum 21M for magenta and the fourth photosensitive drum 21Bk for black, respectively, with a yellow beam LY which is a yellow image-drawing laser beam, a cyan beam LC which is a cyan image-drawing laser beam, a magenta beam LM which is a magenta image-drawing laser beam, and a black beam LBk which is a black image-drawing laser beam.

The optical scanning device 23 includes: an incidence optical system 5; one optical deflector 6 shared by beams of the four colors; a first scanning lens 71; four second scanning lenses 72Y, 72C, 72M, 72Bk; two yellow reflecting mirrors 73Y1, 73Y2 for reflecting the yellow beam LY; two cyan reflecting mirrors 73C1, 73C2 for reflecting the cyan beam LC; three magenta reflecting mirrors 73M1, 73M2, 73M3 for reflecting the magenta beam LM; and a black reflecting mirror 73Bk for reflecting the black beam LBk, which are arranged, respectively, in optical paths of the beams of the four colors, and further includes an optical housing 4 housing these components. A combination of the first scanning lens 71, the second scanning lenses 72Y, 72C, 72M, 72Bk, the yellow reflecting mirrors 73Y1, 73Y2, the cyan reflecting mirrors 73C1, 73C2, the magenta reflecting mirrors 73M1, 73M2, 73M3 and the black reflecting mirror 73Bk makes up an imaging optical system.

The optical housing 4 is an approximately rectangular parallelepiped-shaped housing, and includes an optical deflector housing portion 41 serving as a region in which the optical deflector 6 is housed. In the optical housing 4, the optical deflector housing portion 41 has a loading surface 411 on which the optical deflector 6 is placed.

The optical housing 4 has first to eighth disposition regions 42 to 49, as regions in which the imaging optical system is disposed. In the optical housing 4, the first disposition region 42 is a region located on the other side in the first direction A3 (the rearward side in the forward-rearward direction) with respect to the optical deflector housing portion 41. The second disposition region 43 is a region located on the one side in the axial direction A2 (the upward side in the upward-downward direction) with respect to the optical deflector housing portion 41. The third disposition region 44 is a region located on the one side in the axial direction A2 and on the other side in the first direction A3, with respect to the first disposition region 42. The fourth disposition region 45 is a region located on the other side in the first direction A3, with respect to the third disposition region 44. The fifth disposition region 46 is a region located on the other side in the axial direction A2 (the downward side in the upward-downward direction) with respect to the fourth disposition region 45. The sixth disposition region 47 is a region located on the other side in the axial direction A2 with respect to the third disposition region 44. The seventh disposition region 48 is a region located on the other side in the axial direction A2 with respect to the fourth disposition region 45. The eighth disposition region 49 is a region located on the other side in the axial direction A2 with respect to the fourth disposition region 45, and between the seventh disposition region 48 and the fifth disposition region 46, in the first direction A3.

The incidence optical system 5 is an optical system housed in the optical housing 4 and designed to cause beams of the four colors to become incident on each of a plurality of deflecting faces 631 which are an outer peripheral surface of an aftermentioned polygonal mirror 63. The incidence optical system 5 includes a light source 51, a collimator lens 52 and a cylindrical lends 53. The light source 51 is composed of a laser element, and operable to emit light which sequentially irradiate the deflecting faces 631 of the aftermentioned polygonal mirror 63. The collimator lens 52 is operable to convert the light rays which are spreading after being emitted from the light source 51, into parallel light. The cylindrical lens 53 is operable to convert the parallel light obtained through the collimator lens 52, into line-shaped light which is long in the second direction A4, and form an image on the deflecting faces 631 of the aftermentioned polygonal mirror 63. The second direction A4 is coincident with the rightward-leftward direction which is the direction of the rotational axis of each of the photosensitive drums 21, and is coincident with a main-scanning direction of scanning by the optical scanning device 23 with respect to the photosensitive drum 21.

The first scanning lens 71 is a lens which has a distortion (fθ property) in which an angle of incident light and an image height have a proportional relation, and an elongate lens extending along the second direction A4 (main-scanning direction). Within the optical housing 4, the first scanning lens 71 is disposed in the first disposition region 42 in opposed relation to a part of the deflecting faces 631 of the aftermentioned polygonal mirror 63. The first scanning lens 71 is operable to condense each beam reflected by each of the deflecting faces 631 of the aftermentioned polygonal mirror 63.

The second scanning lens 72Y is a lens which has a distortion (fθ property) as with the first scanning lens 71, and an elongate lens extending along the second direction A4 (main-scanning direction). Within the optical housing 4, the second scanning lens 72Y is disposed in the second disposition region 43. The second scanning lens 72Y is operable to focus a yellow beam LY passing through the first scanning lens 71 to form an image on the outer peripheral surface 211 of the first photosensitive drum 21Y.

The second scanning lens 72C is a lens which has a distortion (fθ property) as with the first scanning lens 71, and an elongate lens extending along the second direction A4 (main-scanning direction). Within the optical housing 4, the second scanning lens 72C is disposed in the third disposition region 44. The second scanning lens 72C is operable to focus a cyan beam LC passing through the first scanning lens 71 to form an image on the outer peripheral surface 211 of the second photosensitive drum 21C.

The second scanning lens 72M is a lens which has a distortion (fθ property) as with the first scanning lens 71, and an elongate lens extending along the second direction A4 (main-scanning direction). Within the optical housing 4, the second scanning lens 72M is disposed in the fourth disposition region 45. The second scanning lens 72M is operable to focus a magenta beam LM passing through the first scanning lens 71 to form an image on the outer peripheral surface 211 of the third photosensitive drum 21M.

The second scanning lens 72Bk is a lens which has a distortion (fθ property) as with the first scanning lens 71, and an elongate lens extending along the second direction A4 (main-scanning direction). Within the optical housing 4, the second scanning lens 72Bk is disposed in the fifth disposition region 46. The second scanning lens 72Bk is operable to focus a black beam LBk passing through the first scanning lens 71 to form an image on the outer peripheral surface 211 of the fourth photosensitive drum 21Bk.

Each of the yellow reflecting mirrors 73Y1, 73Y2 is operable to reflect the yellow beam LY passing through the first scanning lens 71, on an imaging optical path of the yellow beam LY. Within the optical housing 4, the yellow reflecting mirror 73Y1 is disposed in the sixth disposition region 47, and the yellow reflecting mirror 73Y2 is disposed in the second disposition region 43.

Each of the cyan reflecting mirrors 73C1, 73C2 is operable to reflect the cyan beam LC passing through the first scanning lens 71, on an imaging optical path of the cyan beam LC. Within the optical housing 4, the cyan reflecting mirror 73C1 is disposed in the seventh disposition region 48, and the cyan reflecting mirror 73C2 is disposed in the third disposition region 44.

Each of the magenta reflecting mirrors 73M1, 73M2, 73M3 is operable to reflect the magenta beam LM passing through the first scanning lens 71, on an imaging optical path of the magenta beam LM. Within the optical housing 4, the magenta reflecting mirror 73M1 is disposed in the eighth disposition region 49, and the magenta reflecting mirrors 73M2, 73M3 are disposed in the fourth disposition region 45.

Referring to FIG. 3, a yellow beam LY reflected by the deflecting mirror 631 of the polygonal mirror 63 is condensed by the first scanning lens 71, and then reflected by the yellow reflecting mirror 73Y1. Then, after passing through the second scanning lens 72Y, the yellow beam LY is reflected by the yellow reflecting mirror 73Y2, so as to form an image on the outer peripheral surface 211 of the first photosensitive drum 21Y. A cyan beam LC reflected by the deflecting mirror 631 of the polygonal mirror 63 is condensed by the first scanning lens 71, and then reflected by the cyan reflecting mirror 73C1. Then, after passing through the second scanning lens 72C, the cyan beam LC is reflected by the cyan reflecting mirror 73C2, so as to form an image on the outer peripheral surface 211 of the second photosensitive drum 21C. A magenta beam LM reflected by the deflecting mirror 631 of the polygonal mirror 63 is condensed by the first scanning lens 71, and then reflected by the magenta reflecting mirrors 73M1, 73M2. Then, after passing through the second scanning lens 72M, the magenta beam LM is reflected by the magenta reflecting mirror 73M3, so as to form an image on the outer peripheral surface 211 of the third photosensitive drum 21M. A black beam LBk reflected by the deflecting mirror 631 of the polygonal mirror 63 is condensed by the first scanning lens 71 and the second scanning lens 72Bk, and then reflected by the black reflecting mirror 73Bk, so as to form an image on the outer peripheral surface 211 of the fourth photosensitive drum 21Bk.

Figure 6:
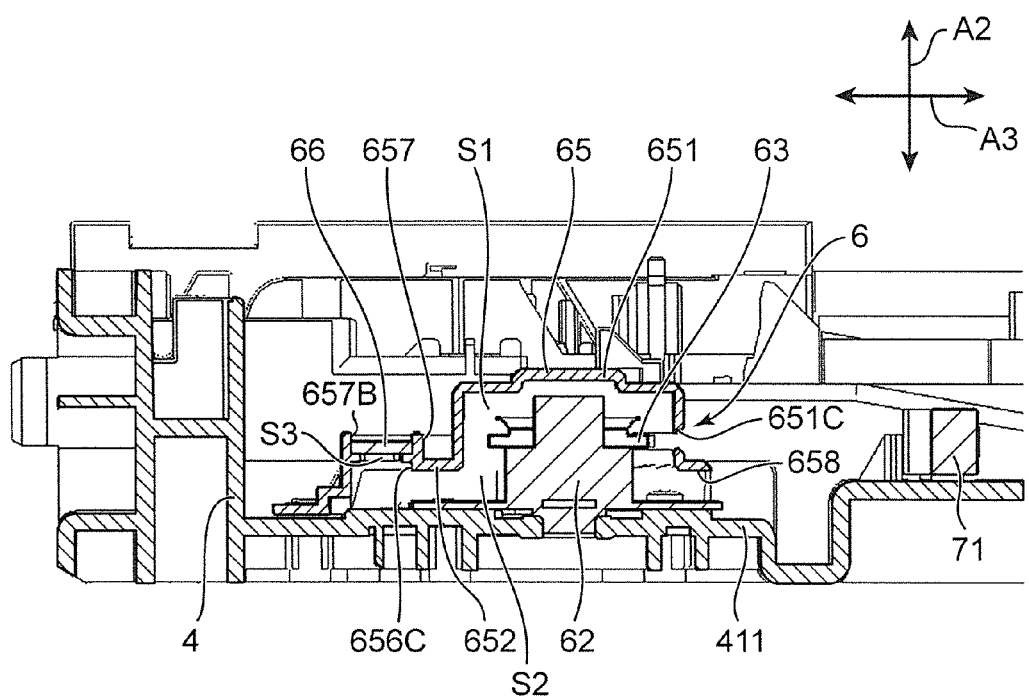
FIG. 6 is a sectional view of the optical deflector.
Figure 7:
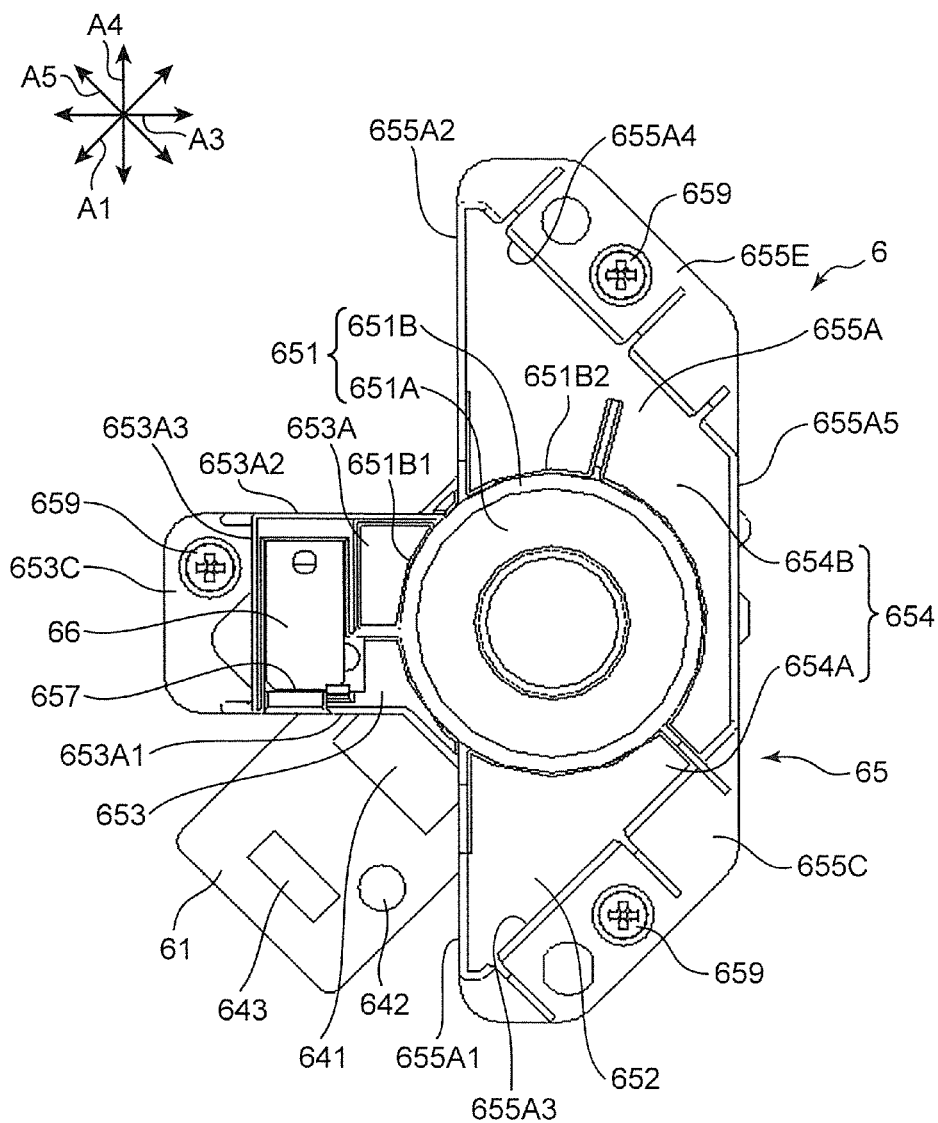
FIG. 7 is a view of the optical deflector as viewed from one side in an axial direction.
Figure 8:
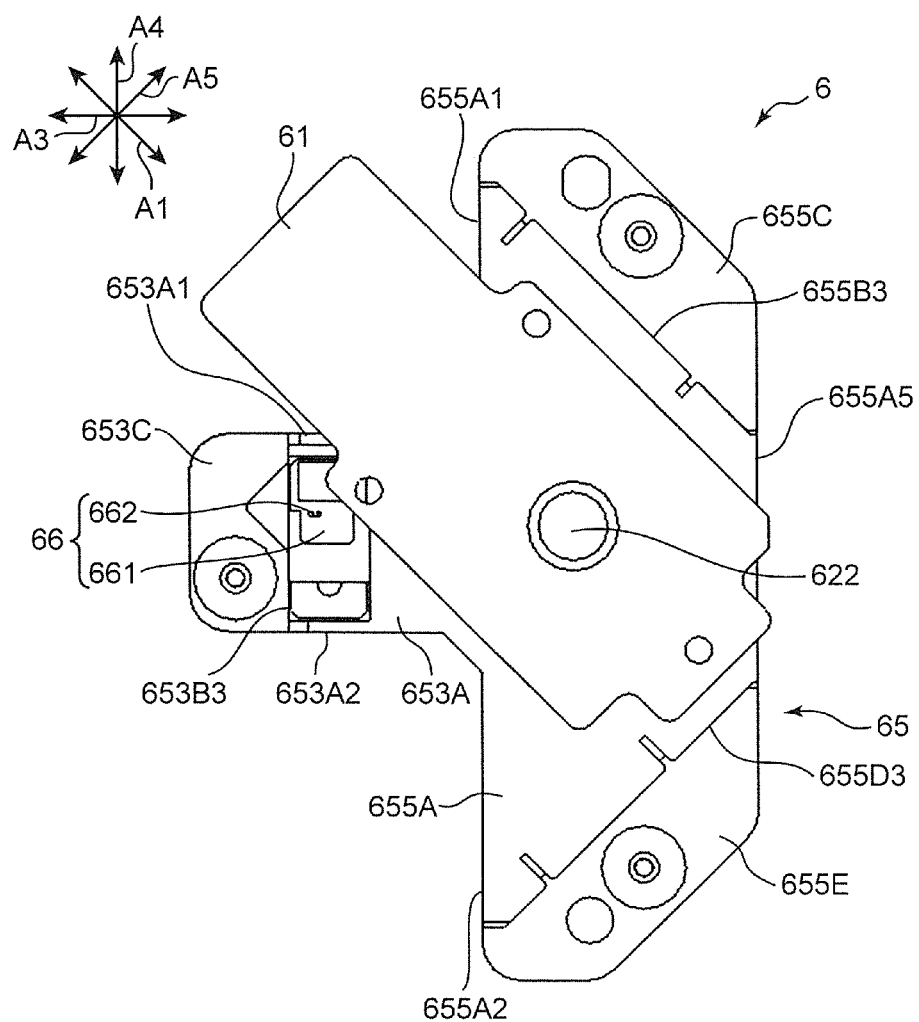
FIG. 8 is a view of the optical deflector as viewed from the other side in the axial direction.
Figure 9:
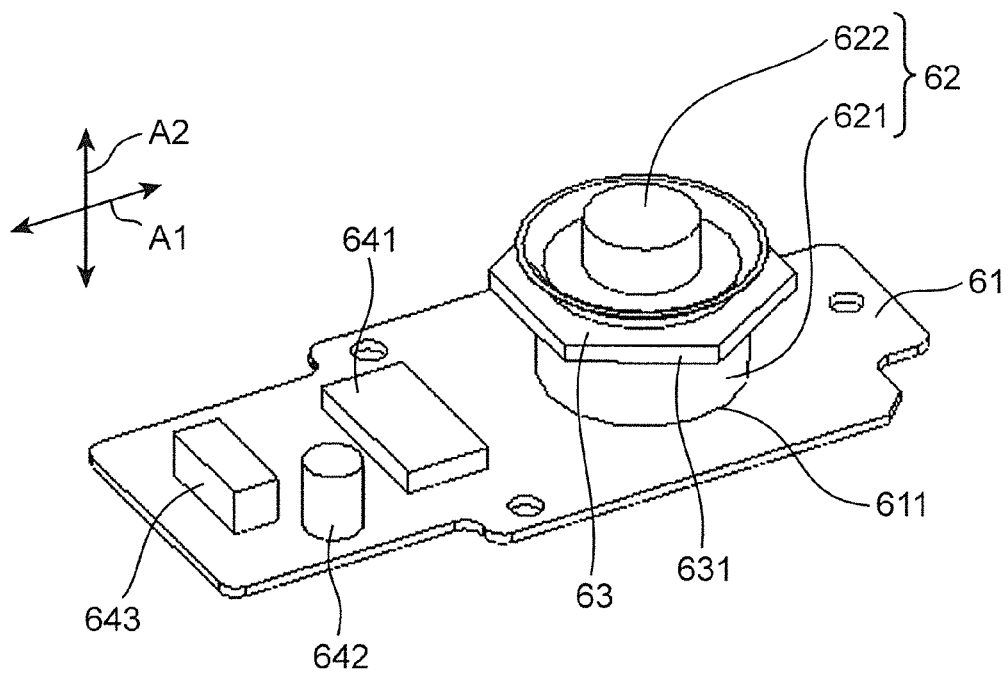
FIG. 9 is a perspective view depicting the optical deflector in a state in which a cover member is removed therefrom.
Figure 10:
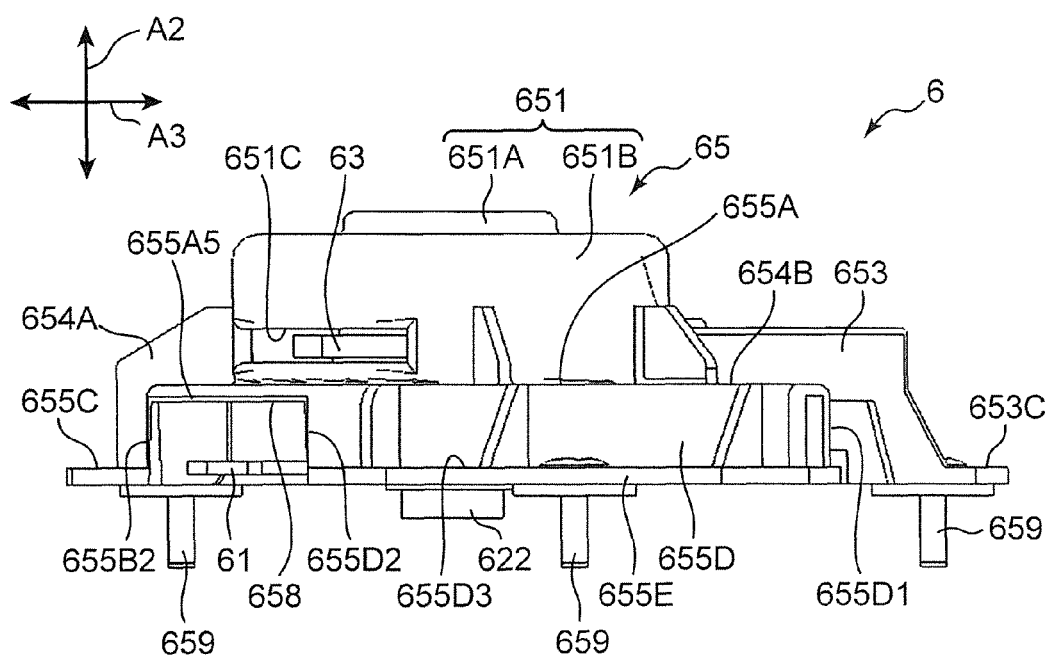
FIG. 10 is a view of the optical deflector as viewed from the other side in a longitudinal direction of a substrate.
Figure 11:
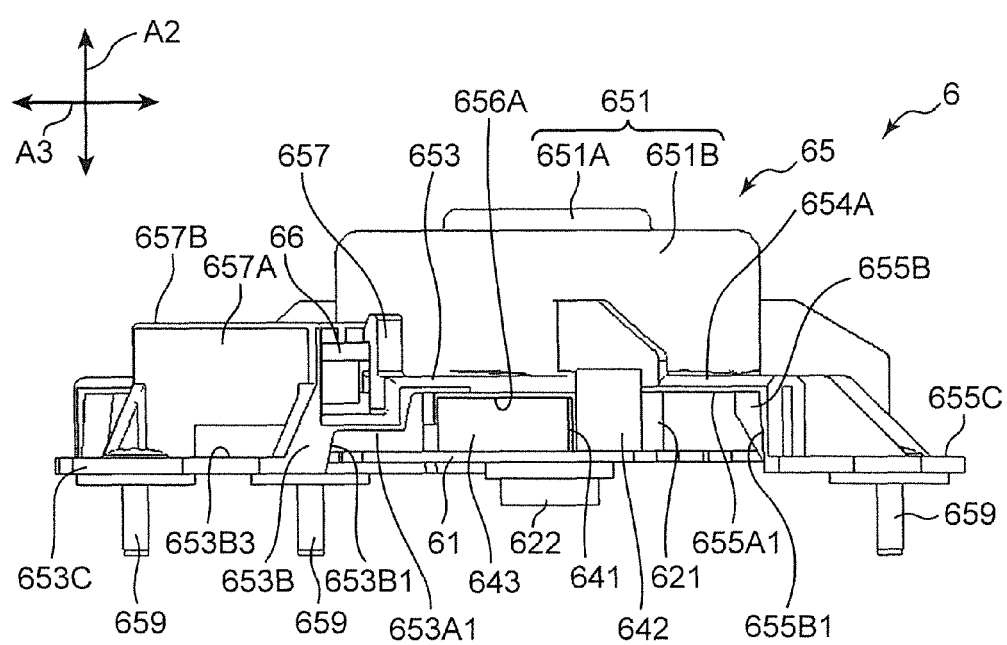
FIG. 11 is a view of the optical deflector as viewed from one side in the longitudinal direction of the substrate.
Figure 12:
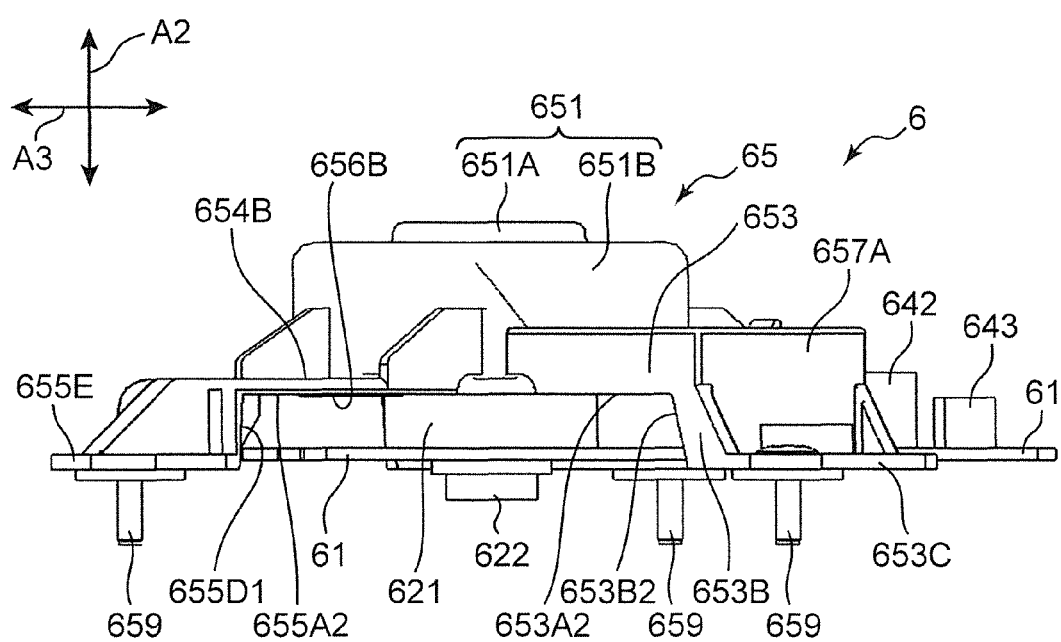
FIG. 12 is a view of the optical deflector as viewed from one side in a third direction.

Next, with reference to FIGS. 2, 5 and 6 to 12, the optical deflector 6 will be described in detail. FIG. 6 is a sectional view of the optical deflector 6, and FIG. 7 and FIG. 8 are, respectively, a view of the optical deflector 6 as viewed from the one side in the axial direction A2 and a view of the optical deflector 6 as viewed from the other side in the axial direction A2. FIG. 9 is a perspective view depicting the optical deflector 6 in a state in which a cover member 65 is removed therefrom. FIG. 10 and FIG. 11 are, respectively, a view of the optical deflector 6 as viewed from the other side in the longitudinal direction A1 and a view of the optical deflector 6 as viewed from one side in the longitudinal direction A1, and FIG. 12 is a view of the optical deflector 6 as viewed from one side in the third direction A5.

The optical deflector 6 is placed on the loading surface 411 of the optical deflector housing portion 41 in the optical housing 4. The optical deflector 6 includes a substrate 61, a drive motor 62, a polygonal mirror 63, a driver IC 641, a capacitor 642, a connector 643, a cover member 65 and a temperature detection unit 66.

Referring to FIGS. 5 and 9, the substrate 61 is a rectangular plate-shaped circuit substrate formed with a through-hole 611 and having a given length along the longitudinal direction A1. The substrate 61 is fixed to the loading surface 411 of the optical deflector housing portion 41 of the optical housing 4. The drive motor 62 includes a motor body 621 and a rotary shaft 622. In the drive motor 62, the rotary shaft 622 is disposed to protrude from the motor body 621 and extend in the axial direction A2 perpendicular to one principal surface of the substrate 61, and rotatably inserted through the through-hole 611. The drive motor 62 is configured such that, upon input of a drive current into the motor body 621, the rotary shaft 622 is rotated about an axis thereof. The drive motor 62 is fixed to the loading surface 411 of the optical deflector housing portion 41 of the optical housing 4.

The polygonal mirror 63 is a polygonal mirror having six deflecting faces 631 formed along respective sides of a regular hexagonal shape thereof. In the polygonal mirror 63, the deflecting faces 631 are sequentially irradiated with light emitted from the light source 51 of the incidence optical system 5. The polygonal mirror 63 is provided on one end of the rotary shaft 622 located on the one side in the axial direction A2, in an integrally rotatable manner. The polygonal mirror 63 is operable to deflect light sequentially irradiating the deflecting faces 631 in such a manner as to enable the deflected light to be scanned with respect to the photosensitive drum 21, while being rotated about the rotary shaft 622 interlockingly with rotation of the rotary shaft 622.

The driver IC 641 is an electronic component for controlling drive of the drive motor 62. The driver IC 641 is mounted on the one principal surface of the substrate 61 in a region spaced apart from the through-hole 611 toward the one side in the longitudinal direction A1. The driver IC 641 is operable to supply a drive current to the motor body 621. The capacitor 642 is an electronic component for rectifying a control current to be input into the driver IC 641. The capacitor 642 is mounted on the one principal surface of the substrate 61 in a region offset toward the one side in the longitudinal direction A1 with respect to the driver IC 641. The connector 643 is electrically connected to a control system for controlling an image forming operation in the image forming apparatus 1, to enable a control signal input from the control system to be received in the optical deflector 6 therethrough. The connector 643 is mounted on the one principal surface of the substrate 61 in a region adjacent to the capacitor 642.

The cover member 65 is a cover covering the polygonal mirror 63 and the drive motor 62, and fixed to the loading surface 411 of the optical deflector housing portion 41 of the optical housing 4. The cover member 65 has a function of suppressing wind noise generated along with the rotation of the polygonal mirror 63, and suppressing attachment of powder dust or the like on the polygonal mirror 63. The cover member 65 includes a first cover portion 651, a second cover portion 652, and third cover portion 657.

The first cover portion 651 covers the polygonal mirror 63 from the one side in the axial direction A2 (upward side in the upward-downward direction) to thereby define a first space S1 in which the polygonal mirror 63 is installed. The first cover portion 651 is formed with a first opening 651C opened in opposed relation to a part of the deflecting faces 631 of the polygonal mirror 63. Specifically, the first cover portion 651 includes a top wall 651A and a peripheral wall 651B.

In the first cover portion 651, the top wall 651A is a disk-shaped wall, and disposed in parallel relation to the loading surface 411 of the optical deflector housing portion 41 of the optical housing 4 and on the one side in the axial direction A2. The peripheral wall 651B is a tubular-shaped wall extending from an outer peripheral edge of the top wall 651A toward the other side in the axial direction A2 (downward side in the upward-downward direction). In the first cover portion 651, the first opening 651C is formed in the peripheral wall 651B. The peripheral wall 651B is formed in a slit-like shape, along a circumferential direction of the peripheral wall 651B. The first opening 651C functions as an opening for allowing light emitted from the light source 51 of the incidence optical system 5 to enter inside the cover member 65 therethrough, and allowing beams deflected by each of the deflecting faces 631 of the polygonal mirror 63 to exit to an outside of the cover member 65. The first opening 651C also functions as an opening for allowing an airflow arising from the rotation of the polygonal mirror 63 to pass therethrough.

The second cover portion 652 is disposed on the other side in the axial direction A2 with respect to the first cover portion 651, to define a second space S2 which is communicated with the first space S1 and in which the drive motor 62 is installed. The second cover portion 652 is formed with a second opening 656A opened in opposed relation to the motor body 621 of the drive motor 62. The second opening 656A functions as an opening for allowing an airflow arising from the rotation of the polygonal mirror 63 to pass therethrough.

In this embodiment, the second cover portion 652 includes a first extension section 653 and a second extension section 654. In the second cover portion 652, the first extension section 653 extends from the first cover portion 651 toward the one side in the first direction A3 (forward side in the forward-rearward direction) intersecting the longitudinal direction A1 of the substrate 61 and orthogonal to the axial direction A2. In the second cover portion 652, the second extension section 654 extends from the first cover portion 651 in the second direction A4 (rightward-leftward direction) orthogonal to both of the axial direction A2 and the first direction A3. In this case, the second opening 656A is formed to extend across the first extension section 653 and the second extension section 654.

Further, in the second cover portion 652, the second extension section 654 includes a first sub-section 654A and a second sub-section 654B. In the second extension section 654, the first sub-section 654A extends from the first cover portion 651 toward the one side in the second direction A4 (rightward side in the rightward-leftward direction). In the second extension section 654, the second sub-section 654B extends from the first cover portion 651 toward the other side in the second direction A4 (leftward side in the rightward-leftward direction). In the second extension section 654, the first sub-section 654A and the second sub-section 654B are integrally formed. In this case, the second opening 656A is formed to extend across the first extension section 653, and the first sub-section 654A of the second extension section 654.

In this embodiment, the second cover portion 652 is formed with a third opening 656B, separate from the second opening 656A. The third opening 656B is opened in opposed relation to the motor body 621 of the drive motor 62, and formed to extend across the first extension section 653, and the second sub-section 654B of the second extension section 654. The third opening 656B functions as an opening for allowing an airflow arising from the rotation of the polygonal mirror 63 to pass therethrough.

The second cover portion 652 will be described in more detail. In the second cover portion 652, the first extension section 653 includes a first wall 653A and a second wall 653B. In the first extension section 653, the first wall 653A is an approximately rectangular plate-shaped wall extending from a first edge segment 651B1 as a part of a peripheral edge of the peripheral wall 651B of the first cover portion 651 on the other side in the axial direction A2, toward the one side in the first direction A3, in parallel relation to the loading surface 411 of the optical deflector housing portion 41 of the optical housing 4. The first wall 653A has a pair of a first marginal side 653A1 and a second marginal side 653A2 each extending from the first edge segment 651B1 of the peripheral wall 651B of the first cover portion 651 toward the one side in the first direction A3, and a third marginal side 653A3 connecting the first marginal side 653A1 and the second marginal side 653A2 together.

In the first extension section 653, the second wall 653B is an approximately rectangular plate-shaped wall extending from the third marginal side 653A3 of the first wall 653A toward the other side in the axial direction A2. The second wall 653B has a fourth marginal side 653B1, a fifth marginal side 653B2, and a sixth marginal side 653B3. The fourth marginal side 653B1 of the second wall 653B extends from a connection point of the third marginal side 653A3 with the first marginal side 653A1 toward the other side in the axial direction A2. The fifth marginal side 653B2 of the second wall 653B extends from a connection point of the third marginal side 653A3 with the second marginal side 653A2 toward the other side in the axial direction A2. The sixth marginal side 653B3 of the second wall 653B connects the fourth marginal side 653B1 and the fifth marginal side 653B2 together. The second wall 653B is provided with a first fixable protruding piece 653C. The first fixable protruding piece 653C is provided to protrude from the sixth marginal side 653B3 of the second wall 653B toward the one side in the first direction A3. The first fixable protruding piece 653C is fixed to the loading surface 411 of the optical deflector housing portion 41 of the optical housing 4 by a fixing member 659.

In the second cover portion 652, the second extension section 654 including the first sub-section 654A and the second sub-section 654B includes a third wall 655A, a fourth wall 655B, and a fifth wall 655D. In the second extension section 654, the third wall 655A is a plate-shaped wall extending from a second edge segment 651B2 as the remaining part other than the first marginal side 651B1 in the peripheral edge of the peripheral wall 651B of the first cover portion 651 on the other side in the axial direction A2, toward the second direction A4, in parallel relation to the loading surface 411 of the optical deflector housing portion 41 of the optical housing 4. The third wall 655A has a seventh marginal side 655A1, an eighth marginal side 655A2, a ninth marginal side 655A3, a tenth marginal side 655A4, and an eleventh marginal side 655A5. The seventh marginal side 655A1 of the third wall 655A extends from the second edge segment 651B2 of the peripheral wall 651B of the first cover portion 651 toward the one side in the second direction A4. The eighth marginal side 655A2 of the third wall 655A extends from the second edge segment 651B2 toward the other side in the second direction A4. The ninth marginal side 655A3 of the third wall 655A is connected to the seventh marginal side 655A1 and extends toward the other side in the longitudinal direction A1. The tenth marginal side 655A4 of the third wall 655A is connected to the eighth marginal side 655A2 and extends toward the other side in the third direction A5. The eleventh marginal side 655A5 of the third wall 655A connects the ninth marginal side 655A3 and the tenth marginal side 655A4 together.

The fourth wall 655B of the second extension section 654 is an approximately rectangular plate-shaped wall extending from the ninth marginal side 655A3 of the third wall 655A toward the other side in the axial direction A2. The fourth wall 655B has a twelfth marginal side 655B1, a thirteenth marginal side 655B2, and a fourteenth marginal side 655B3. The twelfth marginal side 655B1 of the fourth wall 655B extends from a connection point of the ninth marginal side 655A3 with the seventh marginal side 655A1 toward the other side in the axial direction A2. The thirteenth marginal side 655B2 of the fourth wall 655B extends from a connection point of the ninth marginal side 655A3 with the eleventh marginal side 655A5 toward the other side in the axial direction A2. The fourteenth marginal side 655B3 of the fourth wall 655B connects the twelfth marginal side 655B1 and the thirteenth marginal side 655B2. The fourth wall 655B is provided with a second fixable protruding piece 655C. The second fixable protruding piece 655C is provided to protrude from the fourteenth marginal side 655B3 of the fourth wall 655B toward the other side in the third direction A5. The second fixable protruding piece 655C is fixed to the loading surface 411 of the optical deflector housing portion 41 of the optical housing 4 by a fixing member 659.

The fifth wall 655D of the second extension section 654 is an approximately rectangular plate-shaped wall extending from the tenth marginal side 655A4 of the third wall 655A toward the other side in the axial direction A2. The fifth wall 655D has a fifteenth marginal side 655D1, a sixteenth marginal side 655D2, and a seventeenth marginal side 655D3. The fifteenth marginal side 655D1 of the fifth wall 655D extends from a connection point of the tenth marginal side 655A4 with the eighth marginal side 655A2 toward the other side in the axial direction A2. The sixteenth marginal side 655D2 of the fifth wall 655D extends from a connection point of the tenth marginal side 655A4 with the eleventh marginal side 655A5 toward the other side in the axial direction A2. The seventeenth marginal side 655D3 of the fifth wall 655D connects the fifteenth marginal side 655D1 and the sixteenth marginal side 655D2. The fifth wall 655D is provided with a third fixable protruding piece 655E. The third fixable protruding piece 655E is provided to protrude from the seventeenth marginal side 655D3 of the fifth wall 655D toward the other side in the longitudinal direction A1 of the substrate 61. The third fixable protruding piece 655E is fixed to the loading surface 411 of the optical deflector housing portion 41 of the optical housing 4 by a fixing member 659.

In the second cover portion 652 configured as above, the second opening 656A is formed by the first marginal side 653A1 of the first wall 653A, the fourth marginal side 653B1 of the second wall 653B, the seventh marginal side 655A1 of the third wall 655A, and the twelfth marginal side 655B1 of the fourth wall 655B. In the second opening 656A, a pair of a first opening edge segment and a second opening edge segment located opposed to each other are defined by the fourth marginal side 653B1 of the second wall 653B and the twelfth marginal side 655B1 of the fourth wall 655B, and a third opening edge segment connecting the first opening edge segment and the second opening edge segment together is defined by the first marginal side 653A1 of the first wall 653A and the seventh marginal side 655A1 of the third wall 655A.

Further, in the second cover portion 652, the third opening 656B is formed by the second marginal side 653A2 of the first wall 653A, the fifth marginal side 653B2 of the second wall 653B, the eighth marginal side 655A2 of the third wall 655A, and the fifteenth marginal side 655D1 of the fifth wall 655D. In the third opening 656B, a pair of opening edge segments located opposed to each other are defined by the fifth marginal side 653B2 of the second wall 653B and the fifteenth marginal side 655D1 of the fifth wall 655D, and an opening edge segment connecting the pair of opening edge segments together is defined by the second marginal side 653A2 of the first wall 653A and the eighth marginal side 655A2 of the third wall 655A.

In the cover mender 65, the third cover portion 657 is a portion of the cover member 65 defining a third space S3 which is communicated with the second space S2 of the second cover portion 652. In the above embodiment, the third cover portion 657 is disposed on the one side in the axial direction A2 with respect to the first extension section 653 of the second cover portion 652, to define the third space S3 communicated with the second space S2 of the second cover portion 652.

Specifically, the first extension section 653 of the second cover portion 652 is formed with a fourth opening 656C opened toward the one side in the axial direction A2. The third cover portion 657 includes a sixth wall 657A. In the third cover portion 657, the sixth wall 657A is a tubular-shaped wall extending toward the one side in the axial direction A2, from a peripheral edge of the fourth opening 656C of the first extension section 653 to surround the fourth opening 656C. That is, in the third cover portion 657, the third space S3 is defined such that it is communicated with the second space S2 of the second cover portion 652 through the fourth opening 656C, and has a fifth opening 657B at an end thereof on the one side in the axial direction A2.

Further, in the optical deflector 6 according to the above embodiment, the temperature detection unit 66 is mounted to the third cover portion 657 so as to fill the third space S3. The temperature detection unit 66 is operable to detect an internal temperature of the cover member 65.

Referring to FIG. 10, the second cover portion 652 of the cover member 65 defining the second space S2 having the drive motor 62 installed therein is formed with a sixth opening 658 at a position just below the first opening 651C of the first cover portion 651. The sixth opening 658 of the second cover portion 652 is defined by the eleventh marginal side 655A5 of the third wall 655A, the thirteenth marginal side 655B2 of the fourth wall 655B, and the sixteenth marginal side 655D2 of the fifth wall 655D. The sixth opening 658 is intended to release heat radiated from the drive motor 62, to the outside of the cover member 65.

As above, the optical deflector 6 is configured such that the polygonal mirror 63 and the drive motor 62 are covered by the cover member 65, and the internal temperature of the cover member 65 is detected by the temperature detection unit 66. The third space S3 of the third cover portion 657 having the temperature detection unit 66 mounted therein is communicated with the second space S2 having the drive motor 62 installed therein, so that it is possible to suppress the occurrence of a time lag between a time when a change in internal temperature of the second space S2 arises due to heat generated in the drive motor 62, and a time when a change in internal temperature of the third space S3 is detected by the temperature detection unit 66. This makes it possible to realize high detection response to a change in ambient temperature around the drive motor 62 due to heat generated in the drive motor 52.

Further, in the cover member 65, the first cover portion 651 is formed with the first opening 651C, and the second cover portion 652 is formed with the second opening 656A. Upon rotation of the polygonal mirror 63 of the optical deflector 6, air located outside the cover member 65 is sucked inside the cover member 65 from one of the first opening 651C and the second opening 656A, and discharged outside the cover member 65 from the remaining one of the first opening 651C and the second opening 656A. That is, an airflow arising from the rotation of the polygonal mirror 63 passes through the first space S1 defined by the first cover portion 651, the second space S2 defined by the second cover portion 652, and the third space S3 defined by the third cover portion 657, in the cover member 65.

The temperature detection unit 66 is mounted to the third cover portion 657 so as to close the third space S3, as mentioned above. Thus, an airflow arising from the rotation of the polygonal mirror 63 mainly passes through the first space S1 of the first cover portion 651 formed with the first opening 651C and the second space S2 of the second cover portion 652 formed with the second opening 656A, whereas a weak airflow having a low flow rate passes through the third space S3 of the third cover portion 657. As above, a weak airflow having a non-excessively high flow rate passes through the third space S3 of the third cover portion 657, without stagnation of gas in the third space S3. Therefore, it becomes possible to maintain a high degree of accuracy in detection of the internal temperature of the cover member 65 by the temperature detection unit 66 mounted to the third cover portion 657.

Preferably, the temperature detection unit 66 is disposed between the second opening 656A and the third opening 656B, in top plan view as viewed in the axial direction A2. In this configuration, when an airflow arising from the rotation of the polygonal mirror 63 passes through the second opening 656A and the third opening 656B of the second cover portion 656, a weak airflow having a non-excessively high flow rate accurately comes in contact with the temperature detection unit 66. This makes it possible to more reliably maintain a high degree of accuracy in detection of the internal temperature of the cover member 65 by the temperature detection unit 66.

Referring to FIG. 8, the temperature detection unit 66 includes a plate-shaped substrate 661 having heat conductivity, and a temperature detection sensor 662 attached to one principal surface of the substrate 661. The temperature detection unit 66 is mounted to the third cover portion 567 in such a manner that the temperature detection sensor 662 is disposed inside the third space S3. The temperature detection sensor 662 is composed, for example, of a thermistor. The thermistor serving as the temperature detection sensor 662 is configured such that a resistance value thereof varies depending on temperatures. Thus, when a surrounding temperature around the drive motor 62 is changed, an output voltage of the temperature detection unit 66 is changed. The temperature detection unit 66 is operable to output an output voltage from the thermistor serving as the temperature detection sensor 662, as temperature data detected by the temperature detection unit 66. This configuration makes it possible to detect a change in ambient temperature around the drive motor 62 due to heat generated by the drive motor 62, with a high degree of accuracy by using the temperature detection unit attached to the substrate 661, while realizing a high detection response to the change in the ambient temperature.

The above description has been made about the optical deflector 6 configured to be capable of detecting a change in ambient temperature around the drive motor 62 due to heat generated by the drive motor 62 for rotating the polygonal mirror 63. When the polygonal mirror 63 is rotated, not only the drive motor 62 but also the driver IC 641 for controlling drive of the drive motor 62 undergo heat generation. Therefore, the optical deflector 6 needs to be configured to be capable of cooling the driver IC 641. A configuration for cooling the driver IC 641 by utilizing an airflow arising from the rotation of the polygonal mirror 63 will be described below.

In the optical deflector 6 according to this embodiment, when viewed in the longitudinal direction A1, the driver IC 641 is disposed such that it falls within an open region of the second opening 656A (see FIG. 11). In other words, as regards the pair of mutually opposed first and second opening edge segments in the second opening 656A, when viewed in the longitudinal direction A1, the fourth marginal side 653B1 of the second wall 653B serving as the first opening edge segment and the twelfth marginal side 655B1 of the fourth wall 655B serving as the second opening edge segment are opposed to each other across the driver IC 641.

Figure 13:
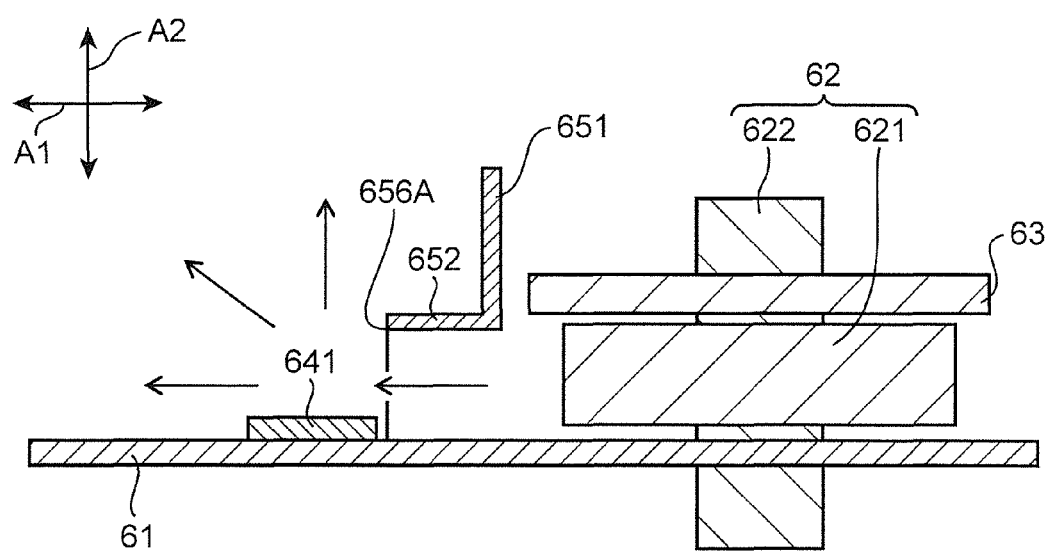
FIG. 13 is a diagram depicting a state of airflow in the optical deflector.

FIG. 13 is a diagram depicting a state of airflow in the optical deflector 6. In the optical deflector 6 configured as above, the polygonal mirror 63 and the drive motor 62 are covered by the cover member 65 including the first cover portion 651 formed with the first opening 651C and the second cover portion 652 formed with the second opening 656A. Upon rotation of the polygonal mirror 63 of the optical deflector 6, air located outside the cover member 65 is sucked inside the cover member 65 from one of the first opening 651C and the second opening 656A, and discharged outside the cover member 65 from the remaining one of the first opening 651C and the second opening 656A. That is, an airflow arising from the rotation of the polygonal mirror 63 passes through the first opening 651C and the second opening 656A of the cover member 65.

In this embodiment, the second opening 656A formed in the second cover portion 652 of the cover member 65 is formed by the first marginal side 653A1 of the first wall 653A, the fourth marginal side 653B1 of the second wall 653B, the seventh marginal side 655A1 of the third wall 655A, and the twelfth marginal side 655B1 of the fourth wall 655B, as mentioned above. This second opening 656A is opened in opposed relation to the motor body 621 of the drive motor 62. Further, when viewed in the longitudinal direction A1 of the substrate 61, the fourth marginal side 653B1 of the second wall 653B and the twelfth marginal side 655B1 of the fourth wall 655B in the second opening 656A are opposed to each other across the driver IC 641. That is, when viewed in the longitudinal direction A1, the driver IC 641 is disposed such that it falls within an open region of the second opening 656A.

Thus, as depicted in FIG. 13, an airflow passing through the second opening 656A along with the rotation of the polygonal mirror 63 is moved along the longitudinal direction A1 corresponding to the longitudinal direction of the substrate 61, without occurrence of a situation where a direction of the flow changes just above the driver IC 641. This makes it possible to suppress a decrease in flow rate of an airflow passing over a surface of the driver IC 641, and thus efficiently cool the driver IC 641 which has undergone heat generation along with the rotation of the polygonal mirror 63 by utilizing an airflow arising from the rotation of the polygonal mirror 63.

In the cover member 65, the first opening 651C formed in the first cover portion 651 provided with the polygonal mirror 63 is opened in opposed relation to a part of the deflecting faces 631 of the polygonal mirror 63. Thus, as compared to a configuration where an opening for air suction is provided just above the polygonal mirror 63, a gap between the first cover 651 and the polygonal mirror 63 can be reduced. This makes it possible to realize a reduction in height dimension of the optical deflector 6.

In the optical deflector 6 according to this embodiment, in addition to the second opening 656A for leading an airflow arising from the rotation of the polygonal mirror 63 toward the driver IC mounted on the substrate 61, the second cover portion 652 is formed with the third opening 656B. In the optical deflector 6 having this configuration, an airflow from the first opening 651C formed in the first cover portion 651 toward the second cover portion 652, or an airflow from the second cover portion 652 toward the first opening 651C, passes through the second opening 656A and the third opening 656B. The optical deflector 6 can be configured such that it further includes a second substrate, in addition to the substrate 61. In this case, the second substrate may be disposed such that it is inserted through the third opening 656B. This makes it possible to provide a configuration capable of cooling an electronic component mounted on the second substrate by utilizing an airflow passing through the third opening 656B along with the rotation of the polygonal mirror 63.

As mentioned above, in the optical deflector 6 configured such that the second opening 656A and the third opening 656B are formed in the second cover portion 652, an airflow from the first opening 651C formed in the first cover portion 651 toward the second cover portion 652, or an airflow from the second cover portion 652 toward the first opening 651C, passes through both of the second opening 656A and the third opening 656B. Thus, a flow rate of an airflow passing through the second opening 656A is inevitably reduced.

Therefore, as depicted in FIG. 7, the second opening 656A is preferably located on the other side in the longitudinal direction A1 of the substrate 61, with respect to a central region of the driver IC 641, in top plan view as viewed in the axial direction A2. Specifically, the second opening 656A is preferably formed such that the first marginal side 653A1 of the first wall 653A and the seventh marginal side 655A1 of the third wall 655A which defines the third opening edge segment connecting the mutually opposed first and second opening edge segments together in the second opening 656A are located on the other side in the longitudinal direction A1 of the substrate 61, with respect to a central region of the driver IC 641, in top plan view as viewed in the axial direction A2.

More specifically, the second opening 656A is preferably formed such that the first marginal side 653A1 of the first wall 653A and the seventh marginal side 655A1 of the third wall 655A overlap a portion of the driver IC 641 on the other side in the longitudinal direction A1 of the substrate 61 with respect to the central region of the driver IC 641, in top plan view as viewed in the axial direction A2. In other words, the central region of the driver IC 641 is located on the one side in the longitudinal direction A1 of the substrate 61 with respect to the first marginal side 653A1 and the seventh marginal side 655A1 of the second opening 656A, i.e., the central region of the driver IC 641 is exposed to an outside of the second cover portion 652. This configuration makes it possible to reduce a level of decrease in flow rate of an airflow passing through the second opening 656A which would otherwise be caused by forming the third opening 656B in the second cover portion 652. Thus, as to a flow rate of an airflow passing over a surface of the driver IC 641 through the second opening 656A, it becomes possible to ensure a value capable of sufficiently cooling the central region of the driver IC which would be heated to a highest temperature.

Figure 14:
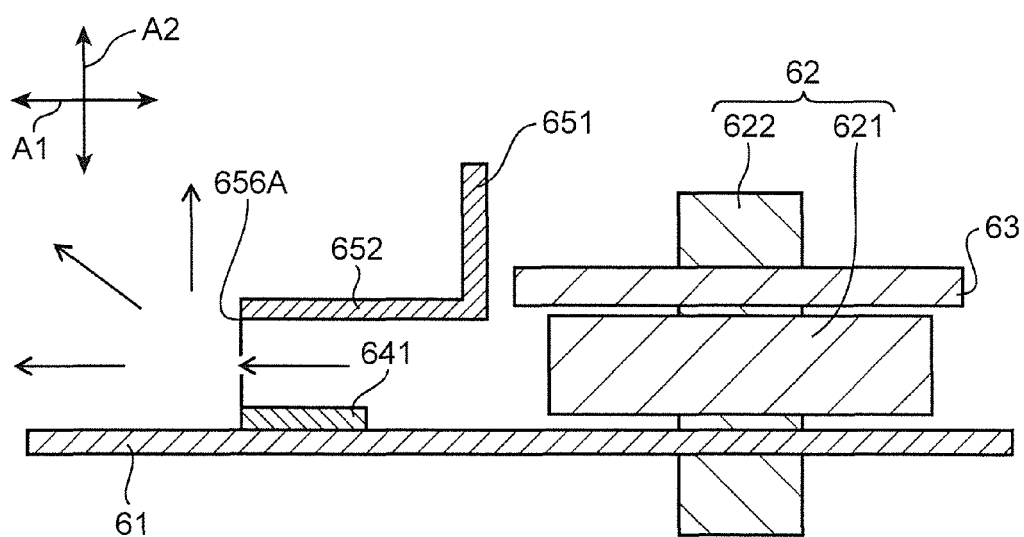
FIG. 14 is a diagram depicting a state of airflow in an optical deflector according to a modified embodiment.

Next, with reference to FIG. 14, one modification of the optical deflector 6 according to this embodiment will be described. FIG. 14 is a diagram depicting a state of airflow in the optical deflector 6 according to the modified embodiment. As compared to the optical deflector 6 according to the above embodiment, the optical deflector 6 according to the modified embodiment is different in terms of the configuration of the second cover portion 652 in the cover member 65. In the cover member 65 in the optical deflector 6 according to the above embodiment, the second cover portion 652 is formed with a plurality of openings including the second opening 656A and the third opening 656B. Differently, in the optical deflector 6 according to the modified embodiment depicted in FIG. 14, only the second opening 656A is formed in the second cover portion 652 of the cover member 65, without forming the third opening 656B therein.

In the second cover portion 652 having this configuration, in top plan view as viewed in the axial direction A2, the second opening 656A is located on the one side in the longitudinal direction A1 of the substrate 61 with respect to the central region of the driver IC 641. Specifically, the second opening 656A is formed such that the first marginal side 653A1 of the first wall 653A and the seventh marginal side 655A1 of the third wall 655A which defines the third opening edge segment of the second opening 656A are located on the one side in the longitudinal direction A1 of the substrate 61 with respect to the central region of the driver IC 641, in top plan view as viewed in the axial direction A2.

More specifically, the second opening 656A is formed such that the first marginal side 653A1 of the first wall 653A and the seventh marginal side 655A1 of the third wall 655A overlap a portion of the driver IC 641 on the one side in the longitudinal direction A1 of the substrate 61 with respect to the central region of the driver IC 641, in top plan view as viewed in the axial direction A2. In other words, the central region of the driver IC 641 is located on the other side in the longitudinal direction A1 of the substrate 61 with respect to the first marginal side 653A1 and the seventh marginal side 655A1 of the second opening 656A, i.e., the central region of the driver IC 641 is covered by the second cover portion 652. This configuration makes it possible to reliably lead an airflow passing through the second opening 656A, to the central region of the driver IC 641. Thus, it becomes possible to reliably cool the central region of the driver IC 641 which would be heated to a highest temperature, by utilizing an airflow arising from the rotation of the polygonal mirror 63.

Figure 15:
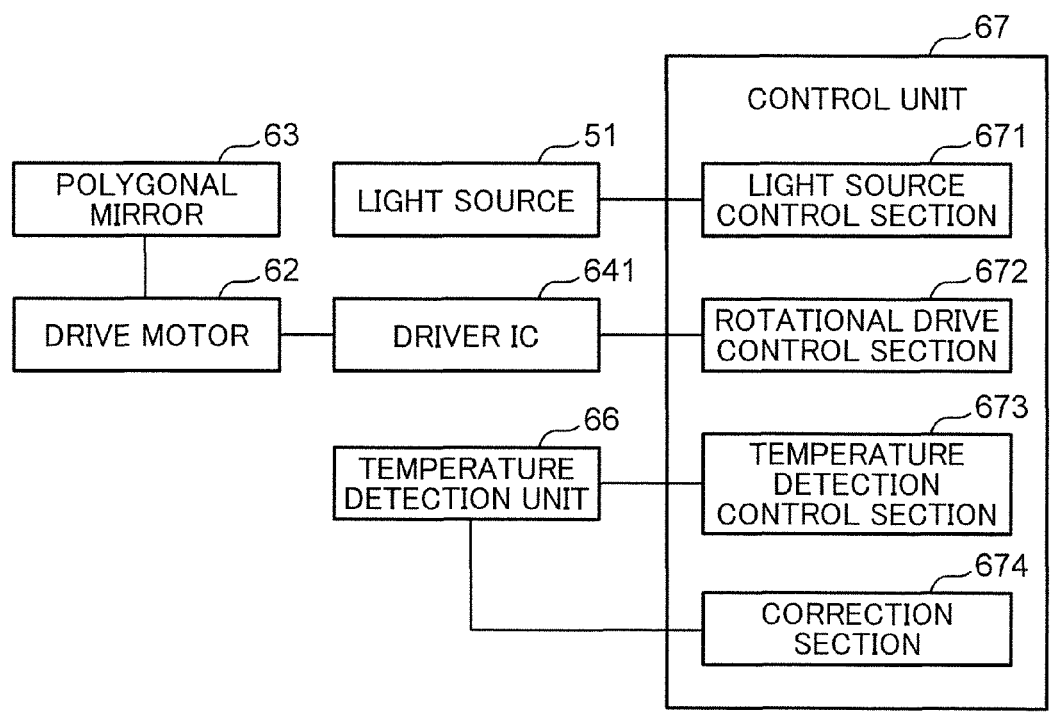
FIG. 15 is a block diagram of the optical scanning device.

FIG. 15 is a block diagram of the optical scanning device 23. The optical scanning device 23 equipped with the optical deflector 6 capable of detecting a change in ambient temperature around the drive motor 62 includes a control unit 67. The control unit 67 is operable, based on temperature data detected by the temperature detection unit 66, to control a correction operation in the optical scanning device 23, associated with correction of positional deviation in scanning applied to each of the photosensitive drums 21 by the polygonal mirror 63. For example, the control unit 67 is composed of a microcomputer incorporating a storage section such as a ROM (Read Only Memory) storing therein a control programs, and a flash memory for temporarily storing therein data, and is configured to control the correction operation in response to read-out of the control program.

The temperature data detected by the temperature detection unit 66 is input into the control unit 67. The control unit 67 is operable, in response to the input, to determine whether or not the temperature data detected by the temperature detection unit 66 is greater than a reference temperature as a criterion. Then, when the temperature data detected by the temperature detection unit 66 is greater than the reference temperature, the control unit 67 is operable to perform the correction of positional deviation in scanning applied to each of the photosensitive drums 21 by the polygonal mirror 63 (this correction will hereinafter be referred to occasionally as "mis-color registration correction"). As used herein, the term "reference temperature" means an internal temperature of the cover member 65 as measured when the optical scanning device 23 is powered on interlockingly with power-on of the image forming apparatus 1, or a temperature approximately equal to outside air temperature.

As mentioned above, the optical scanning device according to this embodiment is capable of highly accurately detecting, by the temperature detection unit 66, a change in ambient temperature around the drive motor 62 due to heat generated by the drive motor 62, while realizing high detection response to the change in the ambient temperature. Thus, it is possible to suppress the occurrence of positional deviation in scanning applied to each of the photosensitive drums 21 by the polygonal mirror 63, in a state before the temperature detection unit 66 detects a change in ambient temperature around the drive motor 62 greater than the reference temperature, and, in response to the detection, effectively perform the mis-color registration correction based on temperature data detected by the temperature detection unit 66.

In this embodiment, the control unit 67 includes a light source control section 671, a rotational drive control section 672, a temperature detection control section 673, a correction section 674. The light source control section 671 is operable to control a light irradiation operation of the light source 51 for irradiating the polygonal mirror 63 with light. The rotational drive control section 672 is operable to control a rotational drive operation of the drive motor 62 for rotationally driving the polygonal mirror 63. The temperature detection control section 673 is operable to perform control of instructing the temperature detection unit 66 to continuously perform a temperature detection operation.

The correction section 674 is operable, based on temperature data detected by the temperature detection unit 66, to perform correction of positional deviation in scanning applied to each of the photosensitive drums 21 by the polygonal mirror 63 (mis-color registration correction). More specifically, the correction section 674 is configured to perform the mis-color registration correction, based on temperature data detected in a given detection duration by the temperature detection unit 66 under control of the temperature detection control section 673. The correction section 674 is operable to calculate an average value of the temperature data detected in the given detection duration, and perform the mis-color registration correction using the calculated average value. Preferably, the given detection duration includes a period of time between a first time point when a rotational speed of the polygonal mirror 63 reaches a given value after start of rotation of the polygonal mirror 63 under control of the rotational drive control section 672, and a second time point just before start of the light irradiation operation of the light source 51 under control of the light source control section 671.

In the given detection duration, the polygonal mirror 63 is rotated under a rated condition that the rotational speed thereof reaches the given value, so that an airflow arising from the rotation of the polygonal mirror 63 is maintained in a stable state. Thus, in the third cover portion 657, the third space S3 having the temperature detection unit 66 mounted therein is maintained in a state in which a weak airflow having a non-excessively high flow rate stably passes therethrough. This provides a high degree of accuracy in detection of the internal temperature of the cover member 65 by the temperature detection unit 66. Therefore, the correction section 674 can perform the mis-color registration correction, based on highly accurate temperature data detected by the temperature detection unit 66.

Next, a mis-color registration correction operation to be performed by the correction section 674 will be described in more detail. When the correction section 674 of the control unit 67 performs a mis-color registration correction operation, it uses mis-color registration correction data stored in the storage section. For example, the mis-color registration correction data is formed as a table in which a temperature difference between the reference temperature and a detection temperature corresponding to temperature data to be detected by the temperature detection sensor 662 of the temperature detection unit 66 is associated with a mis-color registration correction amount. Specifically, the temperature difference between the reference temperature and the detection temperature is set plurally at given temperature intervals (e.g., intervals of 1° C.), and a mis-color registration correction amount necessary for eliminating mis-color registration (a shift amount of a start position of scanning applied to each of the photosensitive drums 21 by the polygonal mirror 63) is associated with each of the plurality of temperature differences.

Figure 16:
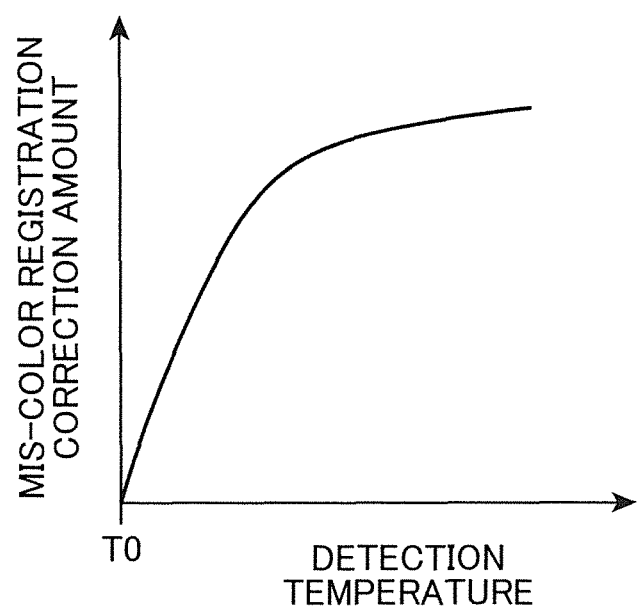
FIG. 16 is a graph depicting a relationship between a temperature detected by a temperature detection sensor and a mis-color registration correction amount.

FIG. 16 is a graph depicting a relationship between the detection temperature by the temperature detection sensor 662 and the mis-color registration correction amount. As depicted in FIG. 16, the mis-color registration correction amount in the mis-color registration correction data becomes larger as the temperature difference between the reference temperature T0 and the detection temperature by the temperature detection sensor 662 becomes larger. Thus, the correction section 674 is operable to gradually increase the mis-color registration correction amount as temperature data detected by the temperature detection sensor 662 becomes larger with respect to the reference temperature T0. The correction section 674 is operable, according to a value of the mis-color registration correction amount determined based on temperature data detected by the temperature detection unit 66, to instruct the light source control section 671 to control the light irradiation operation to control a light-emitting timing of the light source 51 to thereby shift the start timing of scanning applied to each of the photosensitive drum 21 by the polygonal mirror 63, in units of pixel, so as to perform the mis-color registration correction.

The correction section 674 is operable to start the mis-color registration correction operation at an arbitrary timing after the optical scanning device 23 is powered on interlockingly with power-on of the image forming apparatus 1. For example, after power-on of the optical scanning device 23, the mis-color registration correction operation may be repeatedly started with a constant period, or a user may issue an instruction for the start. Alternatively, the mis-color registration correction operation may be started when the image forming apparatus starts a printing operation for one sheet or a continuous printing operation. In the case where the mis-color registration correction operation is started the image forming apparatus starts a continuous printing operation, the mis-color registration correction operation may be repeated until the continuous printing operation is completed.

In the mis-color registration correction operation, the correction section 674 first acquires temperature data detected by the temperature detection unit 66. Then, the correction section 674 determines whether or not the temperature data detected by the temperature detection unit 66 is greater than the reference temperature T0. When the temperature data detected by the temperature detection unit 66 is not greater than the reference temperature T0, the correction section 674 does not perform the mis-color registration correction.

When the correction section 674 determines that the temperature data detected by the temperature detection unit 66 is greater than the reference temperature T0, the correction section 674 calculates a temperature difference between the temperature data and the reference temperature T0. Then, the correction section 674 derives a mis-color registration correction amount associated with the calculated temperature difference, from among the mis-color registration correction data stored in the storage section. Then, the correction section 674 controls the light-emitting timing of the light source 51 based on the derived mis-color registration correction amount, to perform the mis-color registration correction. In this way, the correction section 674 can effectively perform the mis-color registration correction, based on temperature data detected by the temperature detection unit 66.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An optical deflector comprising:
   a drive motor including a motor body and a rotary shaft protruding from the motor body;
   a polygonal mirror provided on one end of the rotary shaft located on one side in an axial direction of the rotary shaft, in an integrally rotatable manner, and having an outer peripheral surface to be irradiated with light, wherein the polygonal mirror deflects light irradiating the outer peripheral surface thereof in such a manner as to enable the deflected light to be scanned with respect to a given irradiation target member, while being rotated about the rotary shaft;
   a cover member covering the polygonal mirror and the drive motor; and
   a temperature detection unit which detects an internal temperature of the cover member,
   wherein the cover member includes:
   a first cover portion covering the polygonal mirror from the one side in the axial direction to thereby define a first space in which the polygonal mirror is installed, the first cover portion being formed with a first opening opened in opposed relation to the outer peripheral surface of the polygonal mirror;
   a second cover portion disposed on the other side opposite to the one side in the axial direction, with respect to the first cover portion, to define a second space which is communicated with the first space and in which the drive motor is installed, the second cover portion being formed with a second opening opened in opposed relation to the motor body; and a third cover portion defining a third space which is communicated with the second space, and wherein the temperature detection unit is mounted to the third cover portion in such a manner as to close the third space.

2. The optical deflector as recited in claim 1, wherein the second cover portion comprises:

a first extension section extending from the first cover portion toward one side in a first direction orthogonal to the axial direction; and a second extension section extending from the first cover portion in a second direction orthogonal to both of the axial direction and the first direction, and wherein the second opening is formed to extend across the first extension section and the second extension section, and the third cover portion is disposed on the one side in the axial direction with respect to the first extension section of the second cover portion, in such a manner as to define the third space which is communicated with the second space.

3. The optical deflector as recited in claim 2, wherein the second extension section of the second cover portion includes a first sub-section extending from the first cover portion toward one side in the second direction, and a second sub-section extending from the first cover portion toward the other side opposite to the one side in the second direction, and wherein:

the second opening is formed to extend across the first extension section and the first sub-section of the second extension section;

the second cover portion is formed with a third opening opened in opposed relation to the motor body, the third opening extending across the first extension section and the second sub-section of the second extension section; and in plan view as viewed in the axial direction, the temperature detection unit is located between the second opening and the third opening.

4. The optical deflector as recited in claim 2, wherein:

the first extension section of the second cover portion is formed with a fourth opening opened toward the one side in the axial direction; and the third cover portion is formed in a tubular shape extending toward the one side in the axial direction, from a peripheral edge of the fourth opening to surround the fourth opening, the third cover portion having a fifth opening at an end thereof on the one side in the axial direction, and defining the third space which is communicated with the second space through the fourth opening.

5. The optical deflector as recited in claim 1, wherein the temperature detection unit includes a plate-shaped substrate having heat conductivity, and a temperature detection sensor attached to one principal surface of the substrate, the temperature detection unit being mounted to the third cover portion in such a manner that the temperature detection sensor is disposed inside the third space.

6. An optical scanning device comprising:

the optical deflector as recited in claim 1;

a light source which emits light toward the outer peripheral surface of the polygonal mirror; and a correction section which corrects positional deviation in scanning applied to the irradiation target member by the polygonal mirror, based on temperature data detected by the temperature detection unit.

7. The optical scanning device as recited in claim 6 which further comprises:

a light source control section which controls a light irradiation operation of the light source;

a rotational drive control section which controls a rotational drive operation of the drive motor for rotationally driving the polygonal mirror; and a temperature detection control section which instructs the temperature detection unit to continuously perform a temperature detection operation, wherein the correction section is configured to perform the positional deviation correction, based on temperature data detected in a given detection duration by the temperature detection unit under control of the temperature detection control section, and wherein the detection duration includes a period of time between a first time point when a rotational speed of the polygonal mirror reaches a given value under control of the rotational drive control section, and a second time point just before start of the light irradiation operation of the light source under control of the light source control section.

8. An image forming apparatus comprising:

the optical scanning device as recited in claim 6, and an image carrying member serving as the irradiation target member which is to be scanned with light deflected by the polygonal mirror so as to form an electrostatic latent image on a surface thereof.

* * * * *